(12) United States Patent
Miao et al.

(10) Patent No.: US 11,082,198 B2
(45) Date of Patent: Aug. 3, 2021

(54) BI-DIRECTIONAL TRANSCEIVER WITH TIME SYNCHRONIZATION

(71) Applicant: FINISAR CORPORATION, Sunnyvale, CA (US)

(72) Inventors: Puhui Miao, Shanghai (CN); Huade Shu, Shanghai (CN); Leo Yu-yu Lin, Shanghai (CN)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/189,741

(22) Filed: Nov. 13, 2018

(65) Prior Publication Data

US 2019/0081771 A1 Mar. 14, 2019

Related U.S. Application Data

(63) Continuation of application No. 15/691,425, filed on Aug. 30, 2017, now Pat. No. 10,211,971.

(60) Provisional application No. 62/381,546, filed on Aug. 30, 2016.

(51) Int. Cl.
| | |
|---|---|
| *H04L 7/00* | (2006.01) |
| *H04J 14/02* | (2006.01) |
| *H04B 10/25* | (2013.01) |
| *H04B 10/079* | (2013.01) |
| *H04B 10/2575* | (2013.01) |
| *H04B 10/564* | (2013.01) |
| *H04J 3/06* | (2006.01) |

(52) U.S. Cl.
CPC ....... *H04L 7/0075* (2013.01); *H04B 10/0795* (2013.01); *H04B 10/2589* (2020.05); *H04B 10/25753* (2013.01); *H04B 10/564* (2013.01); *H04J 14/0202* (2013.01); *H04J 14/0221* (2013.01); *H04J 14/0278* (2013.01); *H04J 3/0641* (2013.01); *H04J 3/0667* (2013.01)

(58) Field of Classification Search
CPC .............. H04L 7/0075; H04B 10/0795; H04B 10/2503; H04B 10/25752; H04B 10/564
USPC ............................................ 398/34, 25, 9, 1
See application file for complete search history.

(56) References Cited

U.S. PATENT DOCUMENTS

| | | | | | |
|---|---|---|---|---|---|
| 5,444,561 | A | * | 8/1995 | Kaminishi | ....... H04B 10/25891 398/155 |
| 5,561,542 | A | * | 10/1996 | Kosugi | ................. H04J 3/0682 398/155 |
| 5,576,876 | A | * | 11/1996 | Takeyari | ............ H04B 10/2537 398/147 |
| 5,673,133 | A | * | 9/1997 | Imaoka | ................. H04L 7/0075 398/202 |

(Continued)

*Primary Examiner* — Oommen Jacob
(74) *Attorney, Agent, or Firm* — Blank Rome LLP

(57) ABSTRACT

An optoelectronic module may include an optical receiver optically coupled with an optical fiber. The optical receiver may be configured to receive time synchronization signals from the optical fiber. The time synchronization signals may be frequency modulated, wavelength modulated, or amplitude modulated and may be received along with received data signals. A time synchronization signal detection module may be communicatively coupled to the optical receiver. The time synchronization signal detection module may be configured to receive the time synchronization signals that are transmitted through the optical fiber and detect frequency modulations, wavelength modulations, or amplitude modulations to recover the time synchronization signals.

20 Claims, 22 Drawing Sheets

(56) References Cited

U.S. PATENT DOCUMENTS

| | | | | |
|---|---|---|---|---|
| 6,486,990 B1* | 11/2002 | Roberts | H04B 10/25077 | 398/146 |
| 6,798,790 B1* | 9/2004 | Enssle | H04N 7/17309 | 348/E7.07 |
| 6,990,159 B1* | 1/2006 | Balb | H04J 3/0688 | 327/141 |
| 7,061,939 B1* | 6/2006 | Chengson | H04L 25/14 | 370/503 |
| 7,203,429 B2* | 4/2007 | Bergano | H04B 10/671 | 398/155 |
| 7,346,279 B1* | 3/2008 | Li | H04B 10/40 | 398/155 |
| 7,502,568 B1* | 3/2009 | Mohan | H04B 10/0799 | 398/195 |
| 9,219,546 B2* | 12/2015 | George | H04J 14/0298 | |
| 9,300,398 B2* | 3/2016 | Chaffee | H04B 10/1123 | |
| 9,331,844 B2 | 5/2016 | Nuijts et al. | | |
| 2002/0030877 A1* | 3/2002 | Way | H04B 10/503 | 398/185 |
| 2002/0039217 A1* | 4/2002 | Saunders | H04B 10/25137 | 398/147 |
| 2004/0062557 A1* | 4/2004 | Takashima | H04B 10/67 | 398/209 |
| 2004/0101311 A1* | 5/2004 | Grohn | H04B 10/0771 | 398/154 |
| 2005/0180575 A1* | 8/2005 | Maeda | H04L 7/0075 | 380/278 |
| 2006/0018475 A1* | 1/2006 | Vig | H04L 9/0852 | 380/256 |
| 2006/0168379 A1* | 7/2006 | Frodsham | G06F 1/06 | 710/107 |
| 2006/0216040 A1* | 9/2006 | Nelson | H04B 10/564 | 398/186 |
| 2007/0025737 A1* | 2/2007 | Kamio | H04B 10/69 | 398/150 |
| 2007/0071039 A1* | 3/2007 | Bang | H04J 3/0685 | 370/535 |
| 2007/0081827 A1* | 4/2007 | Ide | H04B 10/66 | 398/209 |
| 2007/0297801 A1* | 12/2007 | Mostert | H04B 10/27 | 398/81 |
| 2008/0240720 A1* | 10/2008 | Fujii | H04J 14/0282 | 398/102 |
| 2010/0142955 A1* | 6/2010 | Yu | H04J 14/0227 | 398/72 |
| 2011/0026932 A1* | 2/2011 | Yeh | H04B 10/25759 | 398/116 |
| 2011/0135301 A1* | 6/2011 | Myslinski | H04J 14/0201 | 398/34 |
| 2012/0195600 A1* | 8/2012 | Winzer | H04B 10/25891 | 398/143 |
| 2013/0044777 A1* | 2/2013 | Amari | H01S 5/06804 | 372/34 |
| 2013/0077964 A1* | 3/2013 | Mani | H04J 14/0272 | 398/34 |
| 2014/0140689 A1 | 5/2014 | Dahlfort et al. | | |
| 2014/0270805 A1* | 9/2014 | Mani | H04J 3/0667 | 398/155 |
| 2015/0172040 A1* | 6/2015 | Pelekhaty | H04J 14/02 | 398/79 |
| 2015/0229438 A1* | 8/2015 | Le Taillandier De Gabory | H04L 1/0041 | 398/182 |
| 2017/0279591 A1* | 9/2017 | Regev | H04L 43/0852 | |

\* cited by examiner

BI-DIRECTIONAL TRANSCEIVER WITH TIME SYNCHRONIZATION

CROSS-REFERENCE TO RELATED APPLICATIONS

This application is a continuation of U.S. application Ser. No. 15/691,425, filed on Aug. 30, 2017, and claims the benefit of and priority to U.S. Provisional Application No. 62/381,546, filed Aug. 30, 2016, both applications are incorporated herein by reference in their entirety.

BACKGROUND

The present disclosure generally relates to time-synchronization for networks. Time-synchronization aims to coordinate otherwise independent clocks in different network components.

Many services running on various networks require accurate time synchronization for correct operation. For example, if switches do not operate with the same clock rates, then slips will occur and degrade performance. Many networks rely on the use of highly accurate primary reference clocks which are distributed network-wide using synchronization links and synchronization supply units. Accurate time synchronization, or phase synchronization, is often needed to support requirements for the air interface of some mobile systems. Accurate time synchronization between different base stations may be important for the network to operate properly. For example, accurate time synchronization may facilitate handovers, when a device such as a cell phone is transfers from one base station to another base station, or various applications, including location based services, carrier aggregation, coordinated multipoint transmission, and relaying functions. Accurate time synchronization may also facilitate accurately locating mobile devices, such as cell phones.

The claimed subject matter is not limited to embodiments that solve any disadvantages or that operate only in environments such as those described above. This background is only provided to illustrate examples of where the present disclosure may be utilized.

SUMMARY

The present disclosure generally relates to time-synchronization for networks. In some configurations, time synchronization signals may be combined with the primary and/or data signals travelling through a bidirectional optical cable.

In some aspects, a system may include an optical fiber and an optoelectronic module. The optoelectronic module may include an optical transmitter and a controller. The optical transmitter may be optically coupled with the optical fiber. The controller may be communicatively coupled to the optical transmitter. The controller may be configured to operate the optical transmitter to transmit data signals through the optical fiber. The optoelectronic module may be configured to transmit time synchronization signals through the optical fiber along with the data signals.

In some embodiments, an optical multiplexer or demultiplexer may be optically coupled between the optoelectronic module and the optical fiber.

In some aspects, time synchronization signals may be amplitude modulated, frequency modulated, or wavelength modulated to be transmitted through the optical fiber along with the data signals.

The optical fiber may be a bidirectional optical fiber. The system may be a bidirectional dense wavelength division multiplexing system or a bidirectional colorless system, and the system may be configured to transmit data signals and time synchronization signals in a first direction and an opposite second direction through the optical fiber.

The controller may frequency modulate, wavelength modulate, or amplitude modulate the time synchronization signals to be transmitted over the optical fiber along with the data signals.

The optoelectronic module may include a time synchronization signal detection module configured to receive received time synchronization signals from the optical fiber. The received time synchronization signals may be frequency modulated, wavelength modulated, or amplitude modulated and are received along with received data signals.

The controller may include a power and extinction ratio (ER) control module, the power and ER control module may be configured to modulate the amplitude of the signals emitted by the optical transmitter to combine data signals with time synchronization signals. The controller may include an input stage configured to receive one or more time synchronization inputs. The controller may include a driver that receives data input signals and drives the optical transmitter.

The optoelectronic module may include an optical receiver optically coupled to receive optical signals from the optical fiber. The optoelectronic module may include a time synchronization signal detection module configured to detect time synchronization signals received through the optical fiber and output time synchronization output signals.

The optoelectronic module may include a time synchronization signal detection module that includes an amplifier, a low pass filter coupled to the amplifier; and a limiting amplifier coupled to the low pass filter.

The optoelectronic module may include a power controller that may include a power and extinction ratio (ER) control module, and a driver that receives data input signals. The optoelectronic module may include a wavelength controller that may include an input stage configured to receive one or more time synchronization inputs, and a temperature and wavelength control module configured to change the frequency or wavelength of signals emitted by the optical transmitter to transmit time synchronization signals over the optical fiber along with the data signals.

The optical transmitter may be a tunable laser and the optoelectronic module may include a tunable filter optically coupled to an optical fiber.

The optoelectronic module may include a time synchronization signal detection module that may include a limiting amplifier, a mark-space-ratio detector coupled to the limiting amplifier, and a filter controller coupled to the mark-space-ratio detector. The filter controller may be configured to control the tunable filter. The optoelectronic module may include a monitor photodiode optically coupled to the tunable filter, and the monitor photodiode may be electrically coupled to the limiting amplifier.

The optoelectronic module may include a splitter configured to direct a portion of optical signals to the monitor photodiode via the tunable filter.

The optoelectronic module may include a second optical transmitter optically coupled with the optical fiber, and a second controller communicatively coupled to the optical transmitter. The controller may be configured to operate the second optical transmitter to transmit the time synchronization signals through the optical fiber along with the data signals.

The optoelectronic module may include an optical receiver optically coupled with the optical fiber. The optical receiver may be configured to receive received time synchronization signals from the optical fiber. The optoelectronic module may include a time synchronization signal detection module communicatively coupled to the optical receiver. In some aspects, the transmitted time synchronization signals and the received time synchronization signals may include different wavelengths.

The optoelectronic module may include a splitter optically coupled between the optical transmitter and the optical fiber, and the splitter may also be optically coupled between the optical receiver and the optical fiber. The splitter may be configured to direct the transmitted time synchronization signals from the optical transmitter to the optical fiber; and direct the received time synchronization signals from the optical fiber to the optical receiver. In some aspects, the transmitted time synchronization signals and the received time synchronization signals may include the same wavelength.

In some configurations, the optical transmitter may be a directly modulated optical transmitter, a tunable laser with an external modulator, a tunable laser with a Mach-Zehnder modulator, and/or a tunable laser with an electro-absorption modulator.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The present disclosure generally relates to time-synchronization for networks. Examples of time-synchronization methods and systems are described in "Time and phase synchronization aspects of packet networks" Revised Recommendation ITU-T G.8271/Y.1366, July, 2016, INTERNATIONAL TELECOMMUNICATION UNION (available at https://www.itu.int/rec/T-REC-G.8271-201607-P/en), which is incorporated by reference in its entirety.

Many services running on various networks require accurate time synchronization for correct operation. For example, if switches do not operate with the same clock rates, then slips will occur and degrade performance. Many networks rely on the use of highly accurate primary reference clocks which are distributed network-wide using synchronization links and synchronization supply units. Accurate time synchronization, or phase synchronization, is often needed to support requirements for the air interface of some mobile systems, as in the case of time division duplex (TDD) systems (for instance, LTE TDD) or when supporting multimedia broadcast/multicast service (MBMS). Accurate time synchronization between different base stations, e.g., time synchronization values $<|\pm1|\mu s$, may be important for the network to operate properly. For example, accurate time synchronization may facilitate handovers, when a device such as a cell phone is transfers from one base station to another base station, or various applications, including location based services and some LTE-A features. LTE-A features that may benefit from accurate time synchronization may include carrier aggregation, coordinated multipoint transmission (also known as network MIMO), and relaying functions. Accurate time synchronization may also facilitate accurately locating mobile devices, such as cell phones.

Table 1 below lists time and phase requirement classes, as defined in ITU-T G.8271 time and phase synchronization aspects of packet networks). The location based services and some LTE-A features may require even higher time synchronization accuracy, at nanosecond levels, which may make it more challenging for system implementation.

| Level of accuracy | Time error with respect to common reference | Typical applications (for information) |
| --- | --- | --- |
| 1 | 500 ms | Billing, alarms |
| 2 | 100 μs | IP Delay monitoring |
| 3 | 5 μs | LTE TDD (large cell) |
| 4 | 1.5 μs | UTRA-TDD, LTE-TDD (small cell) WiMAX-TDD (some configurations) |
| 5 | 1 μs | WiMAX-TDD (some configurations) |
| 6 | x ns | Various applications, including Location based services and some LTE-A features |

Figure 1:
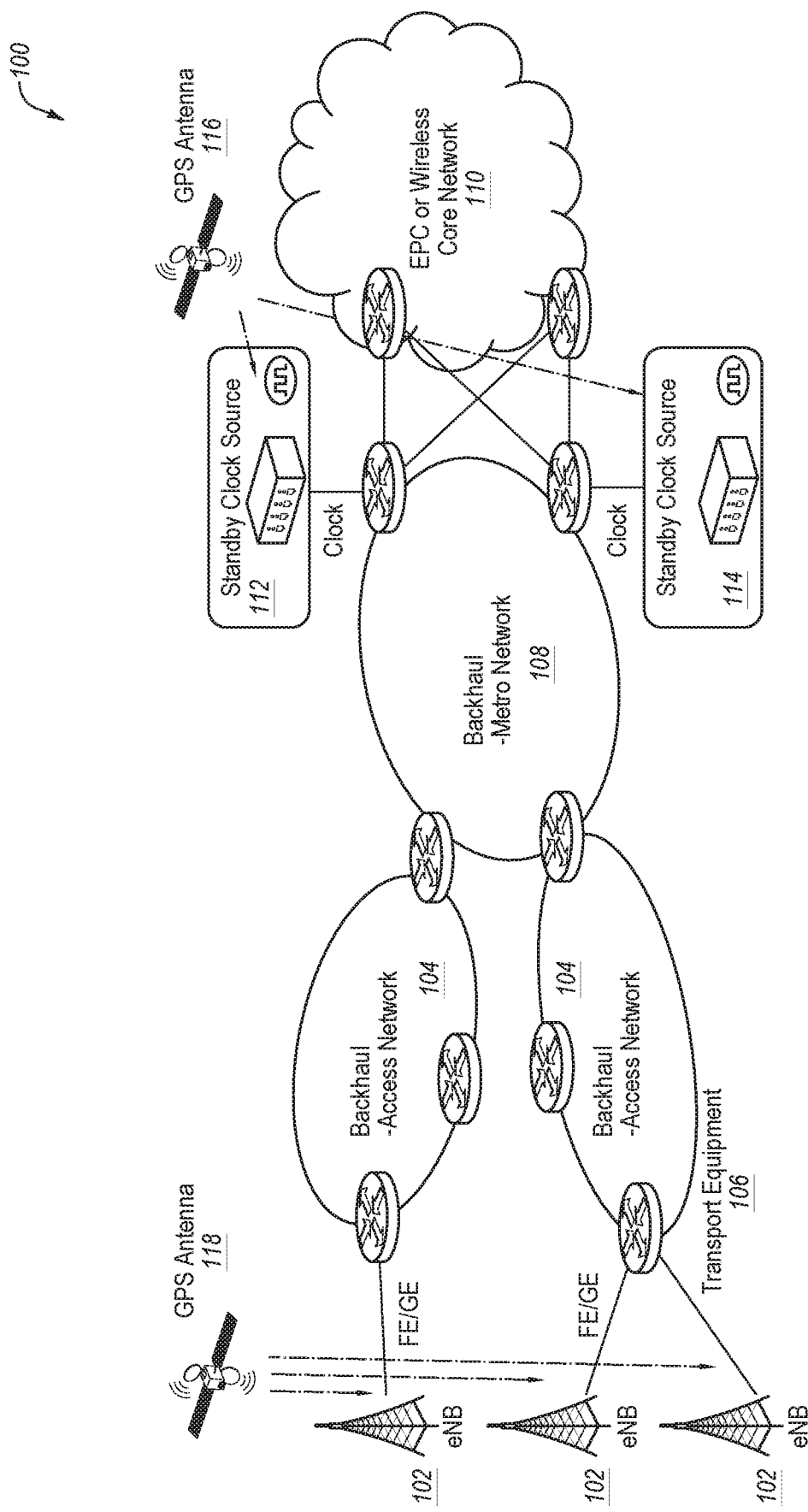
FIG. 1 is schematic view of an example of a wireless network with GPS-based time synchronization.

For many conventional wireless networks, time synchronization is based on information from a global positioning system ("GPS"). FIG. 1 is schematic view of an example of a wireless network 100 with GPS-based time synchronization. As illustrated, the network 100 includes base stations 102 communicatively coupled to backhaul access networks 104 via transport equipment 106. In some configuration, the base stations 102 and the backhaul access networks 104 may exchange Fast Ethernet (FE) or Gigabit Ethernet (GE) signals. The backhaul access networks 104 are communicatively coupled to a backhaul metro network 108. The backhaul metro network 108 may be communicatively coupled to an Evolved Packet Core (EPC) or Wireless Core Network 110. The networks 104, 108, 110 and the base stations 102 may represent different layers of the network 100.

Timing information may be provided by standby clock source 112 and/or standby clock source 114. In particular, the clock sources 112, 114 may generate clock signals that are provided to various components in the network 100. In the illustrated configuration, the clock signals are distributed using GPS antennas 116, 118. Each of the base stations 102 of the network 100 may include a GPS antenna to obtain timing information via the GPS antenna 118. Such configurations may be implemented for time-division duplex ("TDD") systems (such as those deployed in China) or code division multiple access ("CDMA") systems (such as those deployed in the United States or other countries). For GPS-based time synchronization, the signals used for time synchronization may include a pulse per second ("1 PPS") signal and time of date ("TOD") information.

Figure 2:
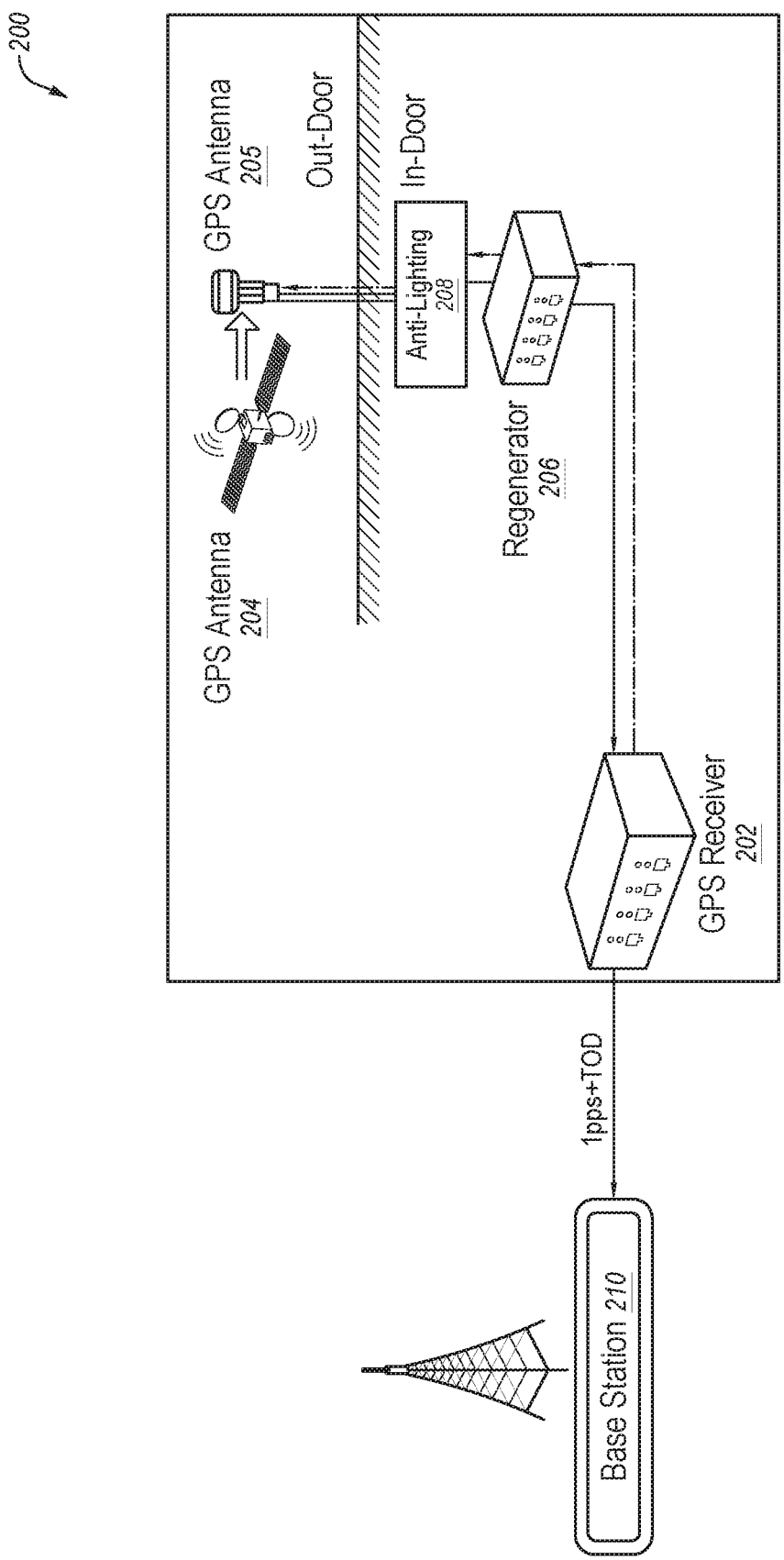
FIG. 2 is a schematic view of a portion of a wireless network.

FIG. 2 is a schematic view of a portion of a wireless network 200. As illustrated for example in FIG. 2, in some conventional networks employing GPS-based time synchronization, a GPS receiver 202 may be communicatively coupled to a GPS antenna 205 to remotely receive signals from a GPS antenna 204. A regenerator 206 may be coupled between the GPS antenna 205 and the GPS receiver 202 to amplify the GPS signals. An anti-lighting module 208 may be included to protect components from lightning or other electrical disturbances. The GPS receiver 202 may receive the GPS signals and transmit 1 PPS and TOD signals to a base station 210, for example, via a cable. In some configurations, the GPS receiver 202 may be connected to the base station 210 or imbedded in the base station 210. In some circumstances, the 1 PPS and TOD signals may have an accuracy of around 200 nanoseconds.

In some circumstances, the configuration illustrated in FIG. 2 may be implemented in the network 100 of FIG. 1. In particular, the configuration illustrated in FIG. 2 may be implemented to provide time synchronization signals for the base stations 102 of FIG. 1.

Networks that implement GPS-based time synchronization may have good accuracy, for example, around 30 nanoseconds, but deployment costs for such configurations may be relatively high. Specifically, use of many GPS antennas/receivers may make implementing GPS-based time synchronization relatively expensive.

Figure 3:
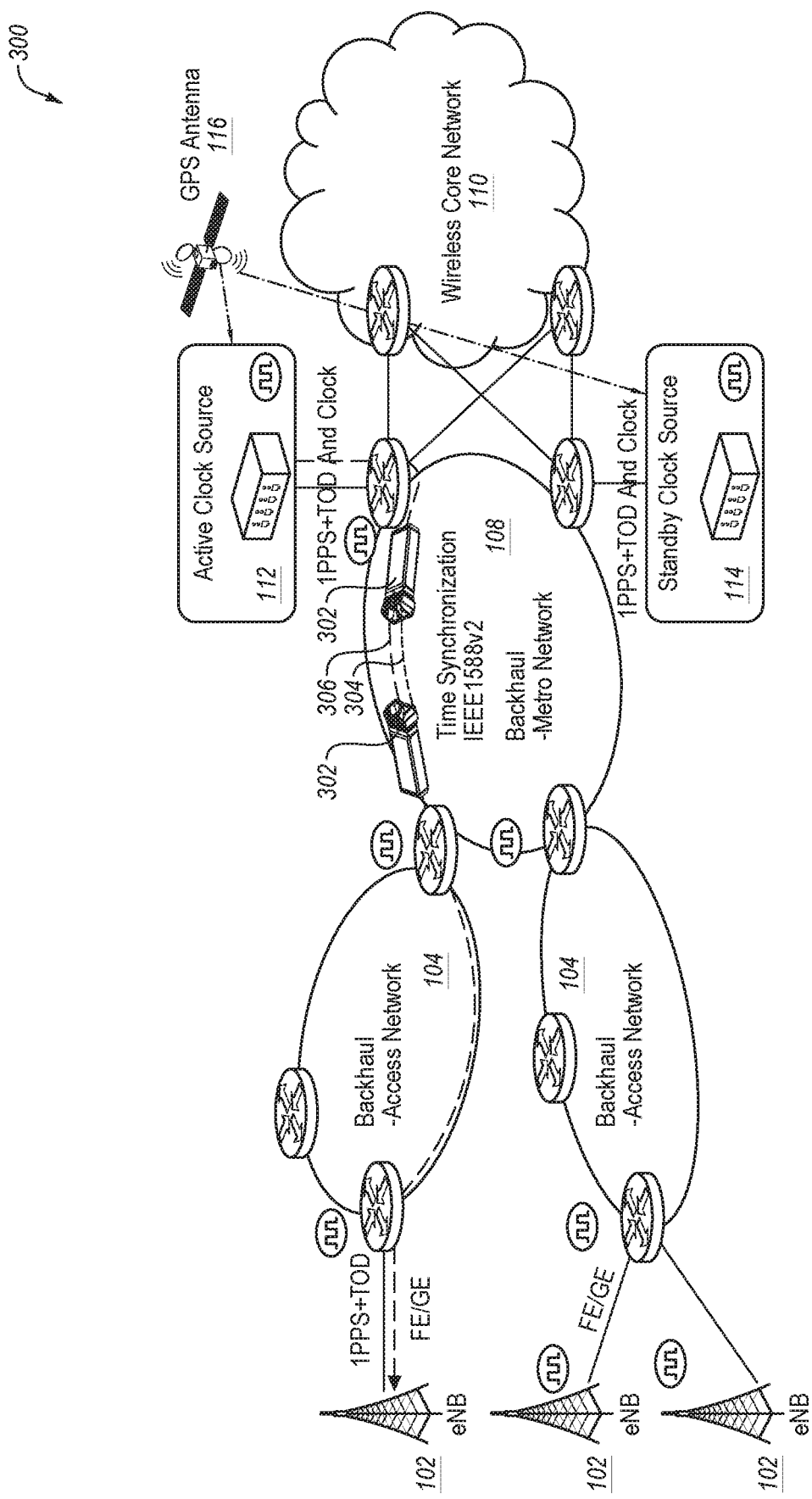
FIG. 3 is a schematic view of another example of a wireless network.

FIG. 3 is a schematic view of another example of a wireless network 300. The network 300 may include any suitable aspects of the network 100, and similar or same features are indicated with similar numbering.

As illustrated for example in FIG. 3, some networks, such as the network 300, may include optical transceivers 302 to transmit data through at least part of the network using optical signals. In particular, the network 300 implements duplex transceivers 302 coupled by optical fibers 304, 306. In some configurations, the network may be a unidirectional optical system. Such systems are configured to transmit optical signals in one direction over a single, first optical cable and transmit signals in an opposite second direction over a second cable different from the first optical cable. Such systems may be considered "unidirectional" because each optical cable is used to transmit optical signals in only one direction. Unidirectional optical systems may implement the duplex transceivers 302 coupled by the two optical fibers 304, 306, one of the optical fibers 304 for transmitting data in a first direction, and a second of the optical fibers 306 for transmitting data in an opposite second direction through the network. In some circumstances, the first and second directions may be referred to as east/west directions.

Some networks, for example, networks that include duplex transceivers, may implement the Precision Time Protocol (PTP) synchronization protocol as defined in the IEEE 1588-2002 standard or PTP Version 2 protocol defined in the IEEE 1588-2008 standard ("IEEE 1588 v2"). In PTP Version 2, time synchronization may be performed at least partially by sending a synchronization signals between a master unit and a slave unit. For example, the master unit may send a signal to a slave unit, and a slave unit sends a response to the master unit. However, in such configurations there may be latency resulting from the time it takes for the signal to travel through a transmission medium, such as an optical cable. This latency must be accounted for in the time synchronization scheme for accurate time synchronization.

To account for this latency, the master unit may receive the response and calculate the time difference or delay between the time the signal was sent and the time the response was received. The time difference may be divided in half to estimate the latency is a first direction (master to slave) as well as a second direction (slave to master).

This delay may represent a latency across the communications medium (i.e., the optical fiber) so that the time synchronization system may compensate for this delay. However, such an estimation is only accurate if the latency in the first direction and the second direction are approximately equal. If the latency in the first direction is different from the latency in the second direction, this may cause issues for time synchronization because the time synchronization system may not properly account for the difference in latency. Differences in latency may be caused by differences in length between the first communications medium (e.g., an east optical fiber) and the second communications medium (e.g., a west optical fiber), or if the length of the first or second communications medium changes for some reason. Furthermore, differences in latency may be caused by transceiver wavelength change in the first or second directions. In addition, it may not be practicable or possible to implement PTP Version 2 for unidirectional backhaul systems, because it may not be possible to send signals between a master unit and a slave unit. In some circumstances, such errors will result in incorrect latencies to be calculated in at least one direction.

The latency in either the first direction or the second direction may change when the length of one of the optical fibers changes. In some circumstances, the latency change may be represented by the following formula:

$$\text{Latency change} = D(\text{ps/nm/km}) * \text{delta\_wavelength (nm)} * L(\text{km})$$

In this formula, D represents the chromatic dispersion coefficient or constant, delta_wavelength represents the wavelength variation of the optical signal, and L represents the length of the transmission medium or optical fiber.

Generally, networks may include a main fiber cable, which may run through different locations within a city or between different cities. The networks may further include relatively short optical cables, which may be described as jumper cables, to connect equipment to the network. For unidirectional systems, if one of the fiber cables is severed, the fiber cable may be fused back together to restore the connection. However, it may be difficult to control and/or account for the latency change resulting from the change in fiber length in the severed/reconnected fiber, because the length would likely change when the optical cable is fused and the connection is restored. Also, the two optical cables for the two directions would likely no longer be the exact same length. So if the fiber is ever severed and reconnected in a unidirectional dense wavelength division multiplexing ("DWDM") system, the change in fiber lengths may have an impact on the time synchronization accuracy.

The latency difference in both directions may be calibrated and/or accounted for during system setup, but latency may further change after setup, for example, during maintenance, which will degrade time synchronization accuracy. This would even apply to relatively short optical cables, for example, optical cables located inside of a building, which may be referred to as "jumper cables." If the fiber jumper cable were changed, for example, from a 1 meter cable to a 2 meter cable then the time synchronization would also be changed. In such circumstances, an operator of network may have the difficult task of monitoring the length of all of the optical fibers or other transmission media, and compensating for their length, particularly when the lengths change. This may make maintenance of the network very difficult because an operator would need to monitor the length of all of the portions of all optical fibers or other transmission media.

Figure 4A:
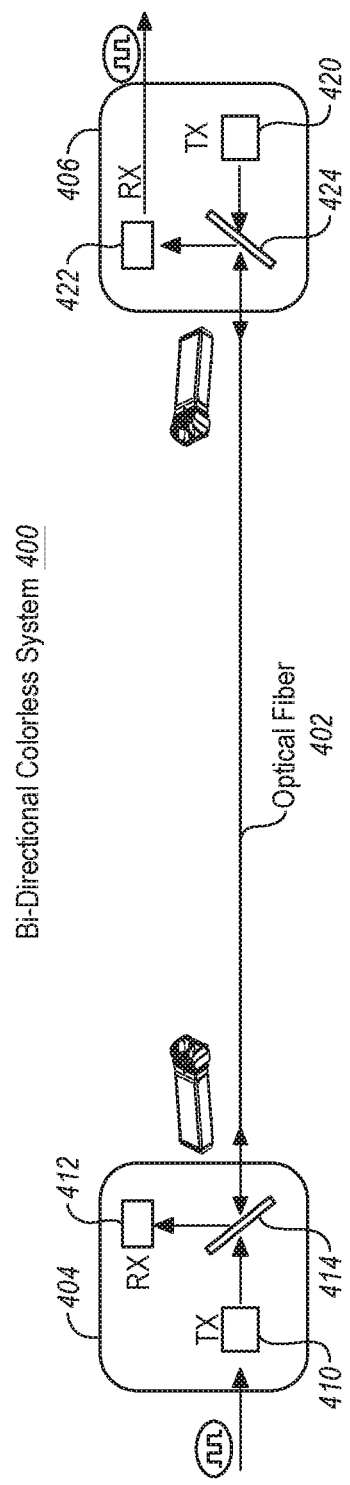
FIG. 4A is a schematic view of an example of bidirectional colorless system.
Figure 4B:
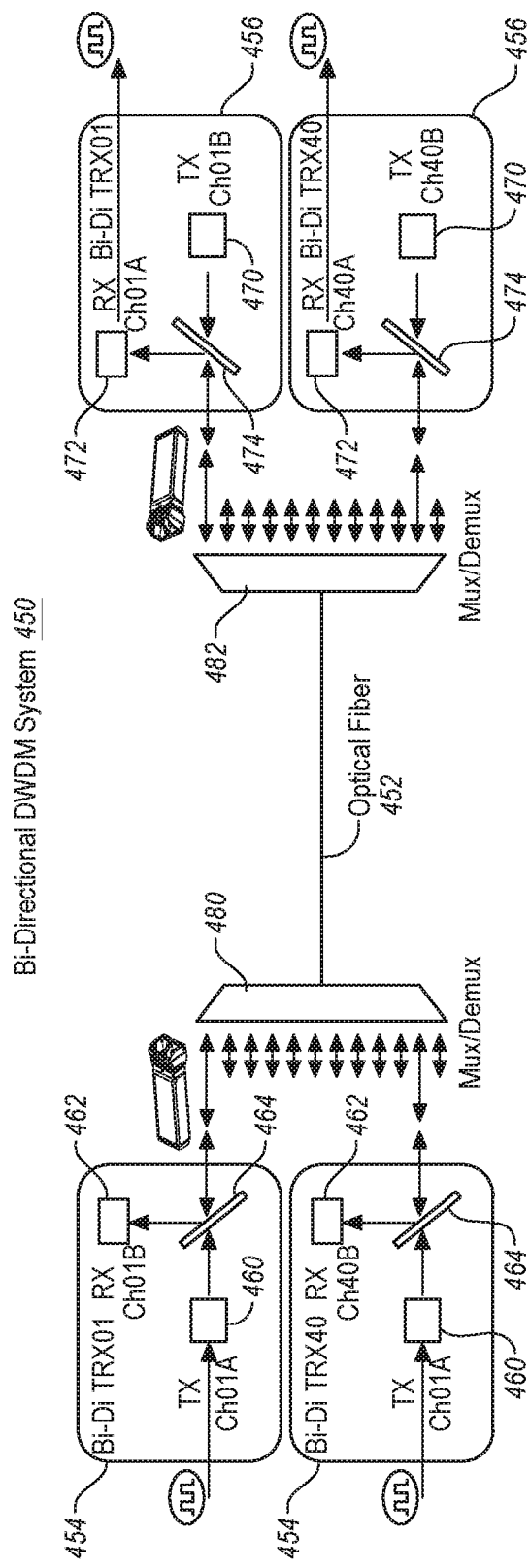
FIG. 4B is a schematic view of an example of a bidirectional dense wavelength division multiplexing ("DWDM") system.

In some embodiments, a bidirectional system may be employed to mitigate the issue of monitoring the lengths of the optical fibers or other transmission media. For example, the bidirectional system may employ one fiber for both the west and the east link, so the length in both directions will always be the same. FIGS. 4A and 4B are examples of bidirectional systems.

FIG. 4A is a schematic view of an example of bidirectional colorless system 400. As illustrated, the system 400 may include bidirectional transceivers 404 and 406 configured to transmit optical signals over an optical fiber 402. In the illustrated configuration, the transceivers 404, 406 are bidirectional, meaning they send and receive optical signals in two directions over the optical fiber 402 (e.g., east and west directions).

Each of the transceivers 404, 406 may be configured to convert electrical signals to optical signals to be transmitted through the optical fiber 402, and may be configured to receive optical signals and convert the optical signals to electrical signals. The transceiver 404 includes transmitter 410, a receiver 412, and a filter 414. The transmitter 410 generates optical signals that are transmitted through the filter 414 and into the optical fiber 402 and travel through the optical fiber 402 to the transceiver 406. The transceiver 404 may receive optical signals (for example, from the transceiver 406), the received optical signals may be directed to the receiver 412 by the filter 414, and the receiver 412 may convert the optical signals to electrical signals.

The transceiver 406 includes transmitter 420, a receiver 422, and a filter 424. The transmitter 420 generates optical signals that are transmitted through the filter 424 and into the optical fiber 402 and travel through the optical fiber 402 to the transceiver 404. The transceiver 406 may receive optical signals (for example, from the transceiver 404), the received optical signals may be directed to the receiver 422 by the filter 424, and the receiver 422 may convert the optical signals to electrical signals.

As illustrated, the bidirectional transceivers of FIG. 4A communicate optical signals between one another over the optical fiber 402. Each of the bidirectional transceivers 404, 406 of FIG. 4A include an optical transmitter 410, 420 to transmit optical signals over the optical fiber 402 and an optical receiver 412, 422 ("RX") to receive optical signals from the optical fiber 402. Each of the bidirectional transceivers also include a filter 414, 424, a splitter or other suitable optical component that directs optical signals between the transmitter, receiver, and the optical fiber. The filters 414, 424 permit optical signals from the transmitter to travel through the filter to the optical fiber 402. The filters 414, 424 reflect signals received from the optical fiber 402 and direct the signals to the receivers 412, 422. Although one example of an optical filter is shown, other optical configurations may be implemented to direct light signals as may be appropriate.

FIG. 4B is a schematic view of an example of a bidirectional dense wavelength division multiplexing ("DWDM") system 450. Rather than including one transceiver on each side of an optical cable, such as the system of FIG. 4A, the system 450 includes multiple transceivers 454 on one side of an optical fiber 452, and multiple transceivers 456 on the other side of the optical fiber 452. Each of the transceivers 454 include a transmitter 560, a receiver 462, and a filter 464, and each of the transceivers 456 include a transmitter 570, a receiver 472, and a filter 474 configured to exchange optical signals via the optical fiber 452. In the illustrated configuration, the system 450 includes 40 channels, with 40 corresponding transceivers 454 on one side of the optical fiber 452 and 40 transceivers 456 on the other side of the optical fiber 452 (only two of which are illustrated in detail, for clarity). However, the system 450 may include any suitable number of channels are corresponding transceivers. In some configurations, each of the channels of the system 450 have different wavelengths. In such configurations, each of the transceivers 454, 456 may be configured to transmit and receive a different wavelength of optical signals, and, in particular, each of the transceivers 454, 456 may be configured to transmit/receive a specific wavelength or range of wavelengths.

The system 450 also includes an optical multiplexer/demultiplexer (mux/demux) 480 on one side of the optical fiber 452 and a mux/demux 482 on the other side of the optical fiber 452. The mux/demux 480 receives the different optical signals (e.g., different channels) from the transmitters 460 of the transceivers 454 and combines the optical signals to be transmitted through the optical fiber 452. The mux/demux 482 receives the combined optical signals from the transceivers 454 and separates the optical signals to be received by the corresponding receivers 472 of the transceivers 456. Similarly, The mux/demux 482 receives the different optical signals (e.g., different channels) from the transmitters 470 of the transceivers 454 and combines the optical signals to be transmitted through the optical fiber 452. The mux/demux 480 receives the combined optical signals from the transceivers 456 and separates the optical signals to be received by the corresponding receivers 462 of the transceivers 464.

As illustrated in FIG. 4B, the system 450 communicates optical signals from the different optical transceivers 454, 456 over the optical fiber 452. The system 450 includes the optical mux/demux 480, 482 that directs optical signals between the different transceivers 454, 456. Although FIG. 4B illustrates four of the transceivers 454, 456 in detail, the system 450 may include any suitable number of transceivers, with each pair of transceivers corresponding to one channel of optical signals that may travel through the optical fiber. The illustrated system 450 may include any suitable number of channels, but in the illustrated embodiment it includes 40 channels. Each of the channels may be associated with a different wavelength of light.

The systems illustrated in FIGS. 4A-4B may be implemented in various networks to transmit optical signals. For example, the systems illustrated in FIGS. 4A-4B may be implemented in the network 100 of FIG. 1 or the network 300 of FIG. 3. The systems illustrated in FIGS. 4A-4B are bidirectional systems, meaning they are configured to transmit signals in a first direction and an opposite second direction over the same optical cable. This is in contrast to unidirectional systems.

Since the systems in 4A-4B use a single optical fiber for both directions of optical signal travel, the length of the optical fiber is the same for both directions of communication. Accordingly, the latency across the communications medium may be approximately the same in both directions. Furthermore, the time difference for signals to travel from the master to the slave, and back from the slave to the master may be divided in half to accurately estimate the latency through the communication medium (in this case, the optical fiber).

FIGS. 4A-4B are merely schematic representations, and the transceivers and/or optical systems may normally include other optical and electrical components as may be appropriate.

Figure 5A:
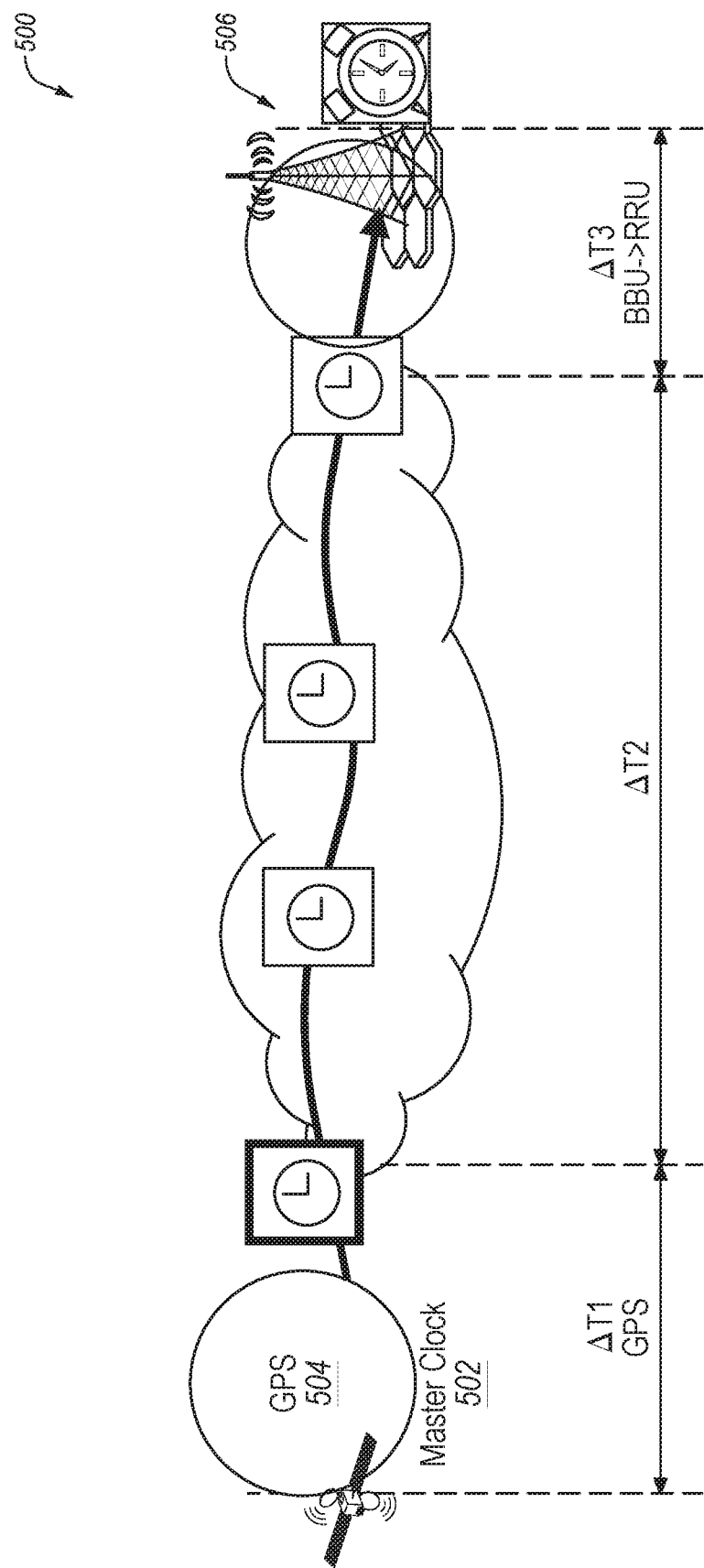
FIGS. 5A-5B are schematic views of unidirectional, two-fiber systems.
Figure 5B:
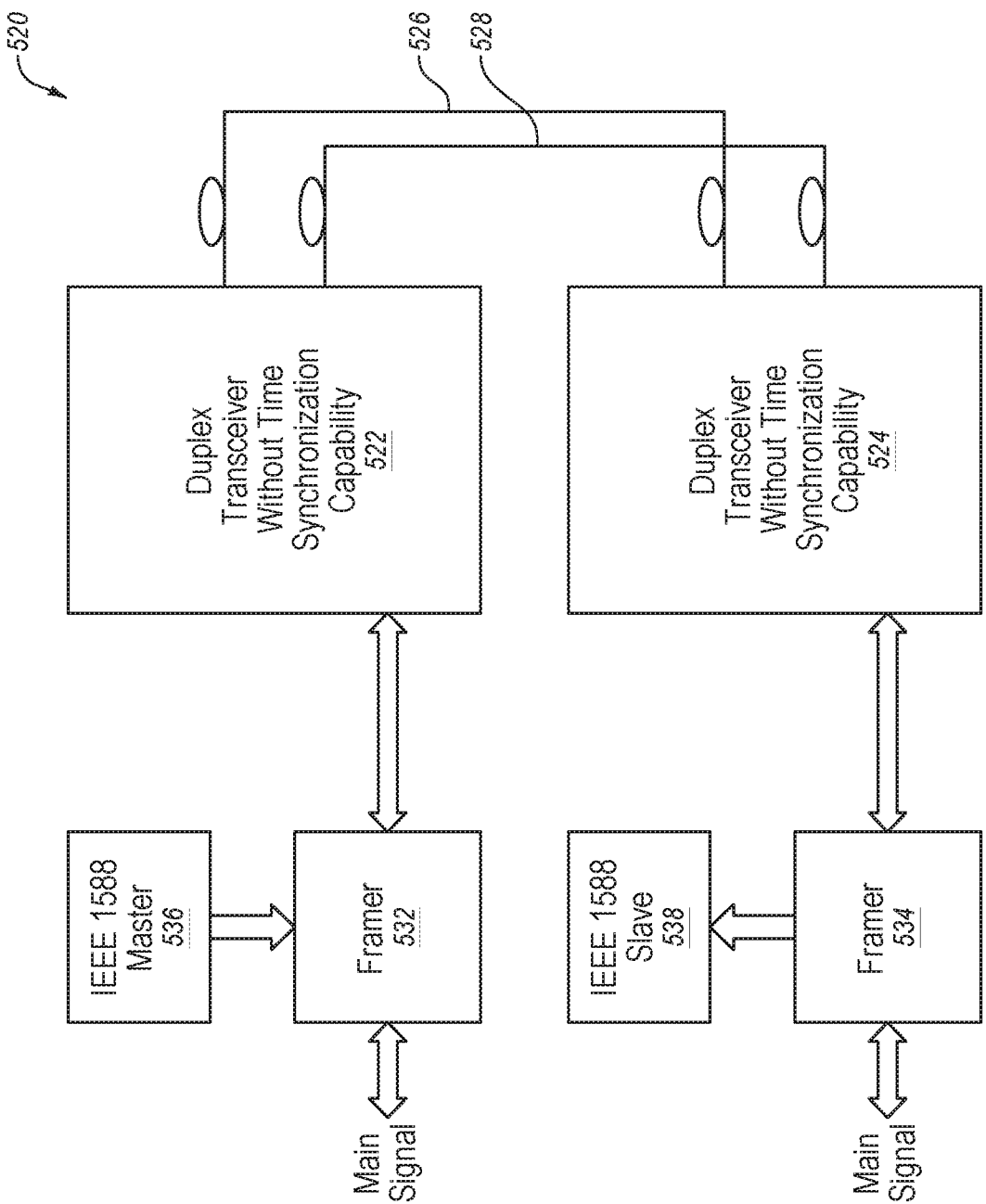

FIGS. 5A-5B are schematic views of a unidirectional, two-fiber systems where IEEE1588V2 time synchronization is implemented in a MAC PHY (Media Access Control Physical) layer, which is at the physical layer of Ethernet link. In particular, FIG. 5A is a schematic view of a system 500. FIG. 5A represents the timing accuracy of a dual fiber unidirectional system 500, such as the system 300 of FIG. 3. As shown, timing signals may be transmitted from a master clock 502 via a GPS 504 to a base stations 506. As the timing signals travel, they accumulate latency delay, and timing accuracy decreases as the timing signals travel through different nodes and mediums.

The timing accuracy of the system 500 may be represented by the formula:

$$\text{Accuracy} = |\Delta T1 + \Delta T2 + \Delta T3|$$

In this formula, $\Delta T1$ represents the time synchronization accuracy of master clock, $\Delta T2$ represents the time synchronization accuracy of transmission system, and $\Delta T3$ represents the time synchronization accuracy between baseband control unit(s) (BBU) and remote radio unit(s) (RRU). In some configurations, the total timing accuracy of this system may be less than 1.5 microseconds, or around 1.5 microseconds. In some circumstances, $\Delta T2$ per node may be less than 30 microseconds. Since the illustrated system is unidirectional, it may require compensation for fiber length change. $\Delta T2$ per node may depend on the fiber length difference between the east optical fiber and the west optical fiber.

FIG. 5B is a schematic view of an example dual fiber unidirectional system 520. As illustrated, the system 520 includes duplex transceivers 522, 524 without time synchronization capabilities optically coupled with two optical fibers, one optical fiber 526 for transmitting optical signals in a first direction and a second optical fiber 528 for transmitting optical signals in an opposite second direction. The system 520 also includes framers, 532, 534, with the framer 532 corresponding to the transceiver 522 and the framer 534 corresponding to the transceiver 534. The framers 532, 534 may distinguish time synchronization signals from other data signals, thereby permitting the time synchronization signals to be extracted for decoding or retransmission.

The framers 532, 534 may also verify the information in the time synchronization signal. The framers 532, 534 may also transmit time synchronization signals. Once the time synchronization signals are extracted they may be transmitted to a corresponding IEEE1588 module 536, 538. As illustrated, one of the IEEE1588 modules 536 associated with the transceiver 522 may be a master IEEE1588 module and the other IEEE1588 module 538 associated with the transceiver 524 may be a slave IEEE1588 module. The IEEE1588 modules 536, 538 may use the received time synchronization signals for time synchronization. In such configurations, the master IEEE1588 module 536 may provide time synchronization signals to the framer 532, which may combine the time synchronization signals with a main signal, which is then transmitted to the transceiver 522, and sent over the optical fiber 526 and received at the transceiver 524. The transceiver 524 sends the main signal with the time synchronization signals to the framer 534, which separates the main signal from the time synchronization signals. The framer 534 sends the time synchronization signals to the slave IEEE1588 module 538.

Figure 6A:
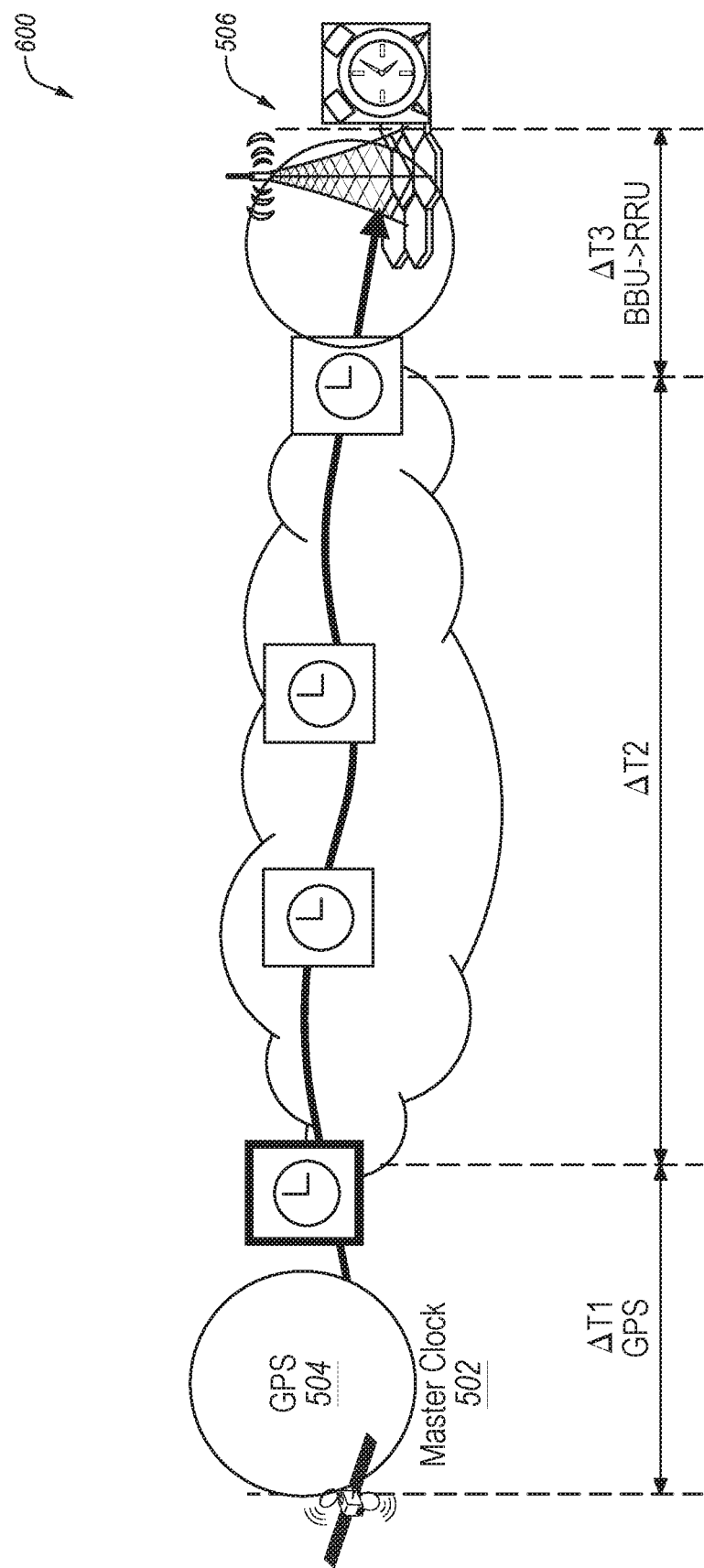
FIGS. 6A-6B are schematic views of bi-directional, single fiber systems.
Figure 6B:
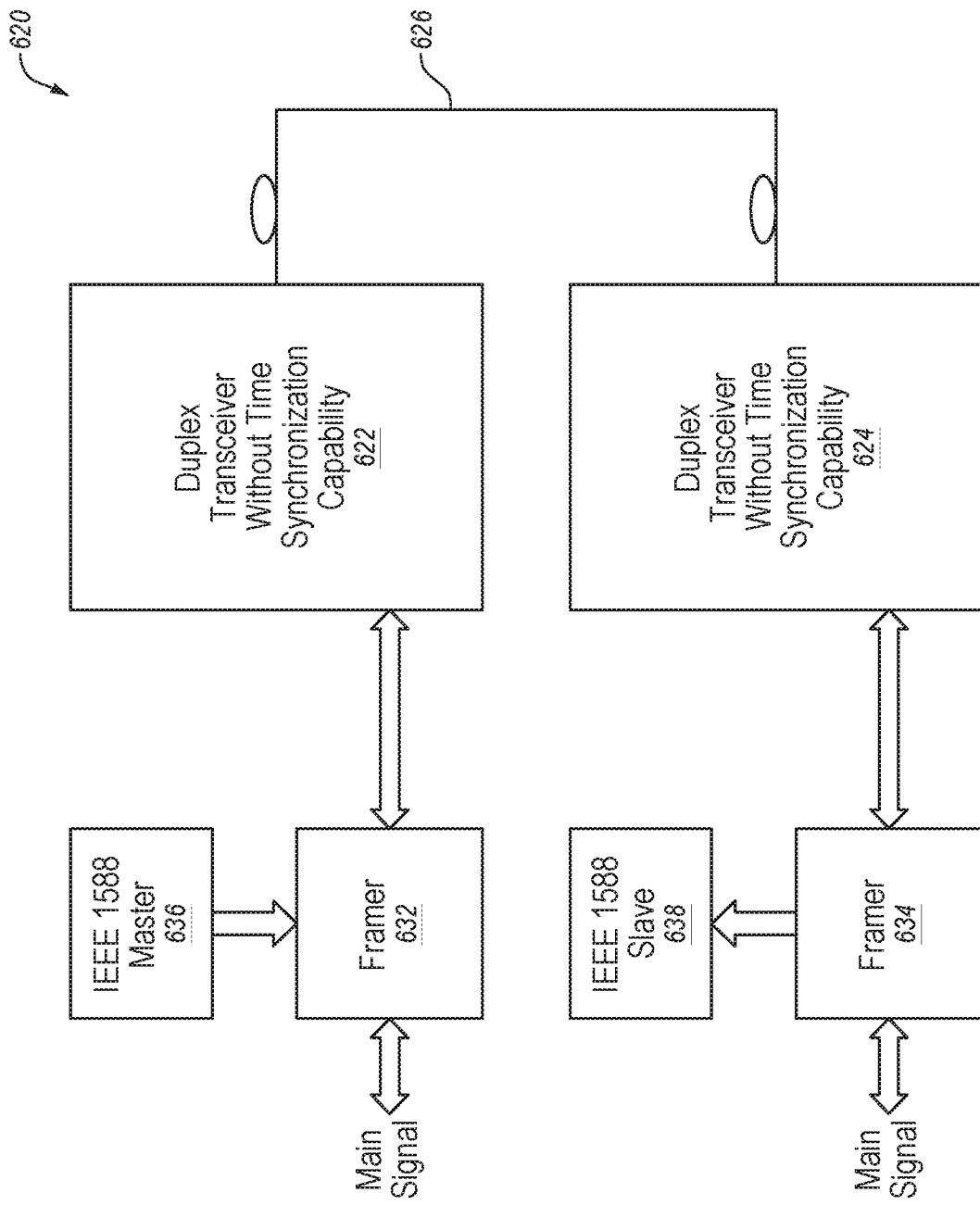

FIGS. 6A-6B are schematic views of a bi-directional, single fiber systems where IEEE1588V2 time synchronization is implemented in a MAC PHY (Media Access Control Physical) layer. In particular, FIG. 6A is a schematic view of a system 600. FIG. 6A represents the timing accuracy of a bi-directional, single fiber system, such as the systems 400, 450 of FIGS. 4A-4B. As shown, timing signals may be transmitted from a master clock 502 via a GPS 504 to a base stations 506. As the timing signals travel, they accumulate latency delay, and timing accuracy decreases as the timing signals travel through different nodes and mediums.

The timing accuracy of the system of FIG. 6A may be represented by the formula:

$$\text{Accuracy} = |\Delta T1 + \Delta T2 + \Delta T3|$$

In this formula, $\Delta T1$ represents the time synchronization accuracy of master clock, $\Delta T2$ represents the time synchronization accuracy of transmission system, and $\Delta T3$ represents the time synchronization accuracy between baseband control unit(s) (BBU) and remote radio unit(s) (RRU). In some configurations, the timing accuracy of this system may be less than 1.5 microseconds, or around 1.5 microseconds. In some circumstances, $\Delta T2$ per node may be less than 30 microseconds. Since the illustrated system is bidirectional, compensation for fiber length change may not be required. $\Delta T2$ per node may depend on the fiber length difference between the east optical fiber and the west optical fiber.

FIG. 6B is a schematic view of an example single fiber bidirectional system 620. The system 620 of FIG. 6B may be a ground system implementing IEEE1588V2 over a single fiber bidirectional system. In the illustrated configuration, IEEE1588V2 may be implemented in a media access control (MAC) physical layer.

As illustrated, the system 620 includes transceivers 622, 624 without time synchronization capabilities optically coupled with a single optical fiber 626. The system 620 also includes framers 632, 634 corresponding to each transceiver 622, 624. The framers 632, 634 may distinguish time synchronization signals from other data signals, thereby permitting the time synchronization signals to be extracted for decoding or retransmission. The framers 632, 634 may also verify the information in the time synchronization signal. Once the time synchronization signals are extracted they may be transmitted to a corresponding IEEE1588 module 636, 638. As illustrated, one of the IEEE1588 modules 636 associated with the transceiver 622 may be a master IEEE1588 module and the other IEEE1588 module 638 associated with the other transceiver 624 may be a slave IEEE1588 module. The IEEE1588 modules 636, 638 may use the received time synchronization signals for time synchronization.

Figure 7:
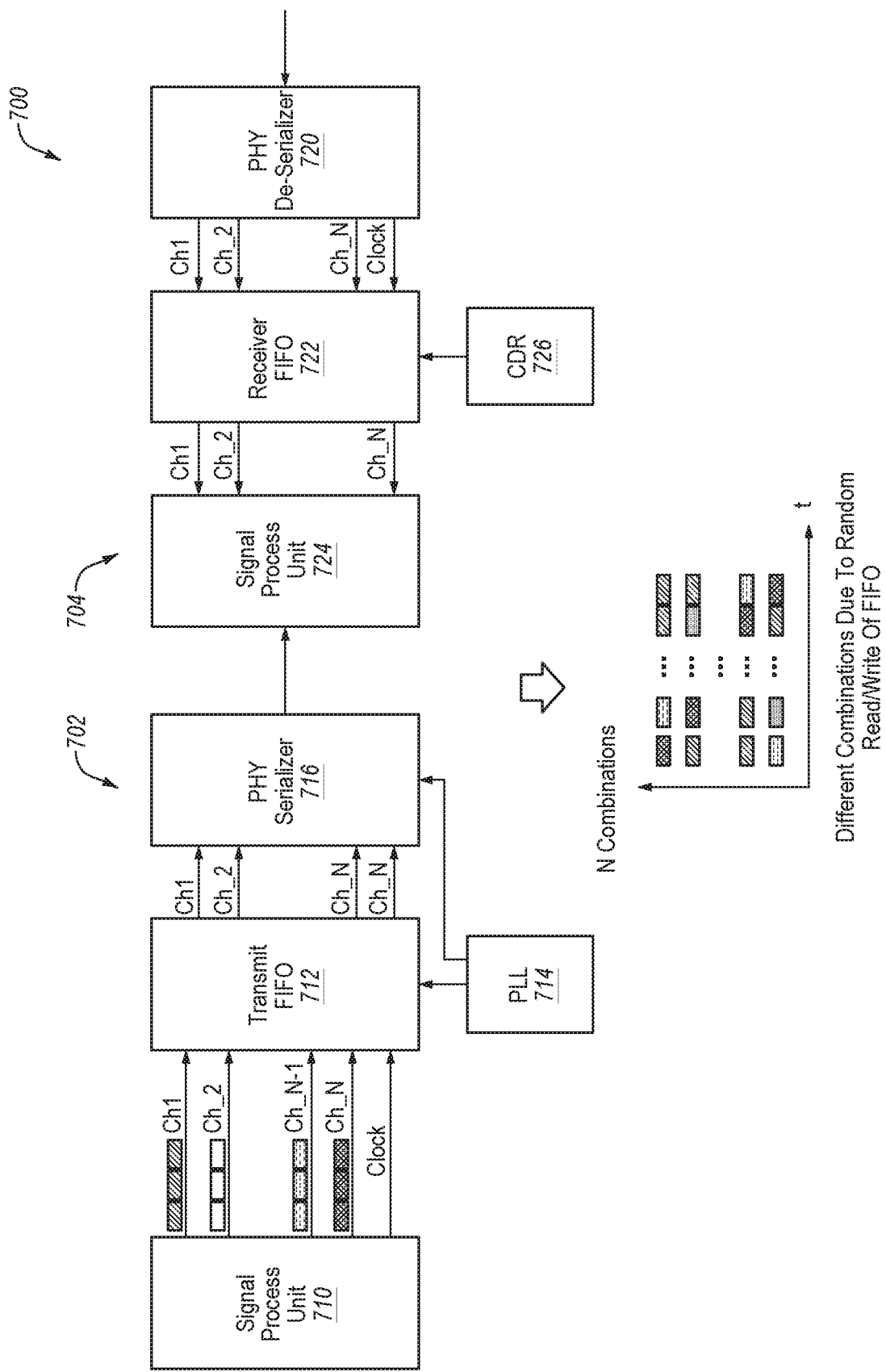
FIG. 7 is a schematic view of an example of a timing circuit.

FIG. 7 illustrates a schematic view of an example of a timing circuit 700. In particular, FIG. 7 illustrates how random read/write of first-in-first-out (FIFO) buffer can degrade time synchronization accuracy. As illustrated, a transmitter side 702 of the timing circuit 700 may include a signal process unit 710, a transmit first-in-first-out (FIFO) buffer 712, a phase-locked loop (PLL) circuit 714, and a physical serializer circuit (PHY Serializer) 716. A receiver side 704 of the timing circuit 700 may include a physical de-serializer circuit (PHY de-serializer) 720, a receiver first-in-first-out (FIFO) buffer 722, a signal process unit 724, and a clock data recovery (CDR) circuit 726. As illustrated in FIG. 7, Ch1~chN may represented buses of the main signal.

The signal process unit 710 and/or 724 may be part of a host that an optical transceiver is plugged into. In some configurations, the signal process unit 710 and/or 724 may include, or function as, the framer, as described above. The framer of the signal process unit 710 and/or 724 may process the main signal, for example, by inserting IEEE1588 package(s) into main data signal stream and/or de-inserting/recovering IEEE1588 package(s) from the main data signal stream.

Together, the transmit FIFO 712, the receiver FIFO 722, the PLL 714, CDR 726, PHY serializer 716 and PHY de-serializer 720 may provide signal interworking between very high speed serial links at the physical layer, and lower speed buses that the host is capable of processing.

Figure 8:
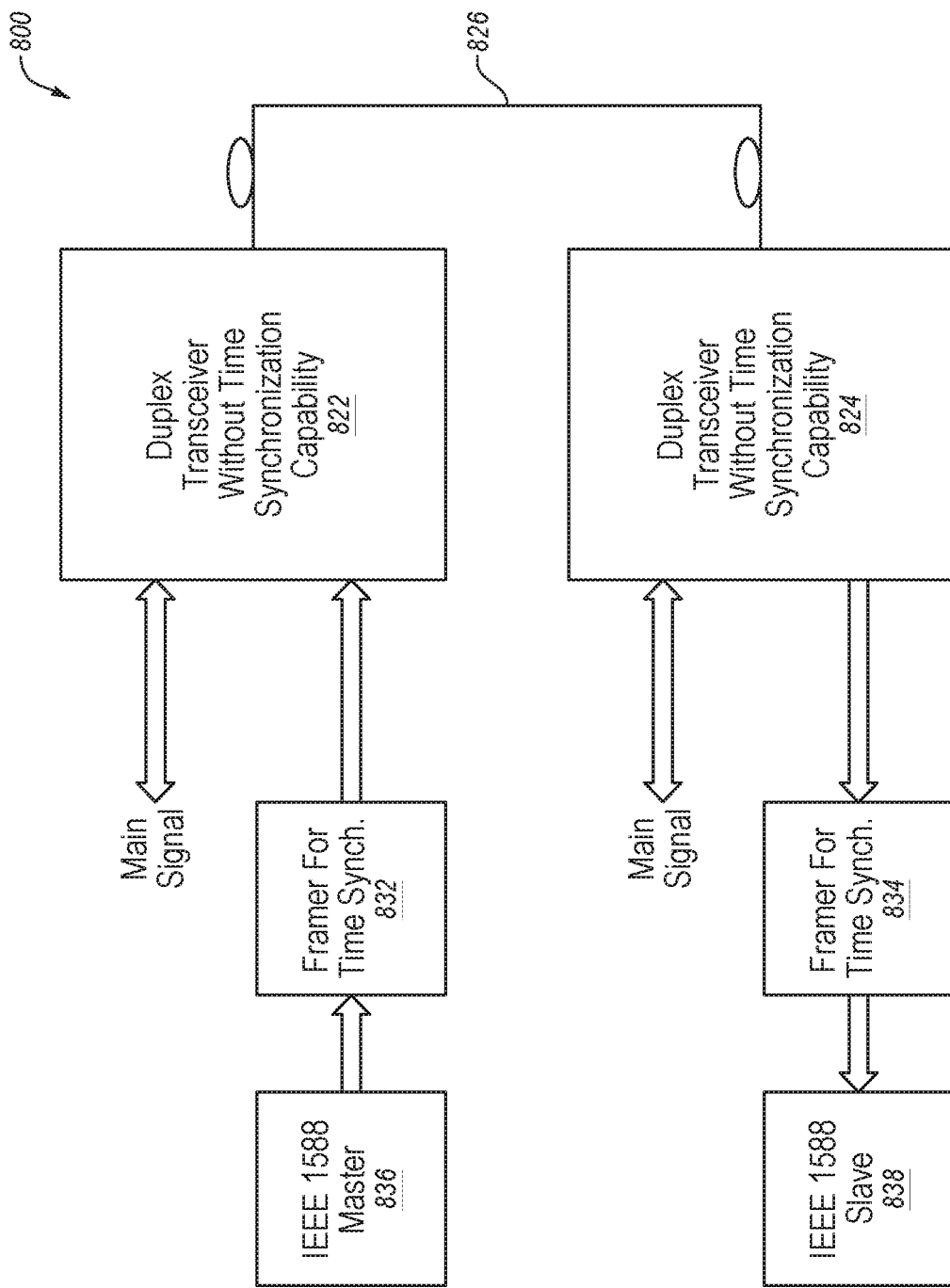
FIG. 8 is a schematic view of an example dual fiber unidirectional system.

As an IEEE1588 package is inserted into the physical layer, the transmit FIFO 712 on transmitter side 702 and the receiver FIFO 722 on the receiver side 704 may cause extra phase variation. If we assume that the signal rate of Ch1~ChN is ~311 MHz, then the phase difference of different combinations due to FIFO effects may be represented as follows: phase variation of different states of FIFO may be N*1/311 MHz, if FIFO depth is set as minimum. The maximum latency change may be around N* the interval of the bus signal, because there may be N possibilities of FIFO read/write during interworking between the parallel bus and the serial main signal. Accordingly, the latency variation due to random read/write at the FIFO may be:

102 ps for 10 Gbps PHY signal
257 ps for 25 Gbps PHY signal
1028 ps for 100 Gbps PHY signal FIG. 8 illustrates a schematic view of an example dual fiber unidirectional system 800. The system 800 may be a ground system implementing IEEE1588V2 over a single fiber bidirectional system. In the illustrated configuration, IEEE1588V2 may be implemented over a specific electrical path in each of the bidirectional modules. As illustrated, the system 800 includes bidirectional transceivers 822, 824 without time synchronization capabilities optically coupled with a single optical fiber 826.

The system 800 also includes framers 832, 834 corresponding to each transceiver 822, 824. The framers 832, 834 may receive synchronization signals from a specific electrical path, thereby permitting the time synchronization signals to be extracted for decoding or retransmission. The framers 832, 834 may also verify the information in the time synchronization signal. The framers 832, 834 may be similar or identical to the framers 632, 634 of FIG. 6B, except in the configuration of FIG. 8, a separate input and output signal is used to ensure more accurate time synchronization. In particular, the framer 832 provides time synchronization signals to the transceiver 822, and the main data signal is provided to the transceiver separately. Similarly, the framer 834 receives time synchronization signals from the transceiver 824, and the main data signal is separate from the time synchronization signals. In such configurations, the synchronization signal bit rate may be much lower than the main signal, and the random read/write of FIFO related time synchronization errors (see FIG. 7 and associated description) may be decreased or eliminated. For example, time synchronization errors may be decreased or eliminated because the bit-rate of main signal is the same or approximately the same as the bit-rate of time synchronization packets. Conversely, the higher the signal bit rate, the larger the time synchronization change may be due to interworking between the parallel bus and the serial main signal because of the random read/write errors of FIFO as described above.

Once the time synchronization signals are extracted they may be transmitted to a corresponding IEEE1588 module 836, 838. As illustrated, one of the IEEE1588 modules 836 associated with the transceiver 822 may be a master IEEE1588 module and the other IEEE1588 module 838 associated with the other transceiver 824 may be a slave IEEE1588 module. The IEEE1588 modules 836, 838 may generate/receive the time synchronization signals for time synchronization.

The timing accuracy of the system 80 of FIG. 8 may be represented by the formula:

$$Accuracy = |\Delta T1 + \Delta T2 + \Delta T3|$$

In this formula, $\Delta T1$ represents the time synchronization accuracy of master clock, $\Delta T2$ represents the time synchronization accuracy of transmission system, and $\Delta T3$ represents the time synchronization accuracy between baseband control unit(s) (BBU) and remote radio unit(s) (RRU). In some configurations, the timing accuracy of this system may be less than 1.5 microseconds, or around 1.0 microseconds. In some circumstances, $\Delta T2$ per node may be less than 30 microseconds. $\Delta T2$ may depend on the fiber length difference in the east and the west directions. Since the illustrated system is bidirectional, compensation for fiber length change may not be required. $\Delta T2$ per node may depend on the fiber length difference between the east optical fiber and the west optical fiber. The illustrated configuration may facilitate accurate time synchronization, as may be required for some networks.

In the illustrated systems, the time synchronization signal may be combined with the main data transmission signal to be transmitted over the optical fiber 826. For example, in one configuration the time synchronization signal may be amplitude modulated. In such configurations, the time synchronization signal may be added to the main data transmission signal by envelope modulation of the optical signal with a low modulation amplitude, which can be performed by modulating the bias current of the transmitter laser, or by modulating the pump current of a semiconductor optical amplifier (SOA) following the transmitter laser, or by other means to vary the average power of the optical signal. In any case, the time synchronization signal can be detected by monitoring the slow power variation of the optical signal on a (relatively) low-bandwidth photo diode at the Rx direction.

In another example, the time synchronization signal may be frequency/phase modulated. In such configurations, the time synchronization signal can be added by frequency/phase modulation of the optical signal with a low modulation amplitude, which can be performed by modulating the DBR current of a tunable DBR laser, or by modulating the bias current of the transmitter laser. The time synchronization signal can be detected by adding one edge filter of the optical signal with an extra photo diode at the receive direction.

In some circumstances, the bit width of the time synchronization signal may be limited if the time synchronization signals are amplitude modulated. Furthermore, some configurations where amplitude modulated time synchronization signals are implemented may introduce cross talk to the data signal. In such circumstances, frequency/phase modulated time synchronization signals may be preferable.

In some of the disclosed embodiments, the time synchronization channel is separate from the main signal. Accordingly, the bit-rate of the time synchronization signal will not change along with the main signal. Therefore, the random read/write related time synchronization errors (see FIG. 7 and associated description) may be decreased or eliminated, and time synchronization may be improved.

Figure 9:
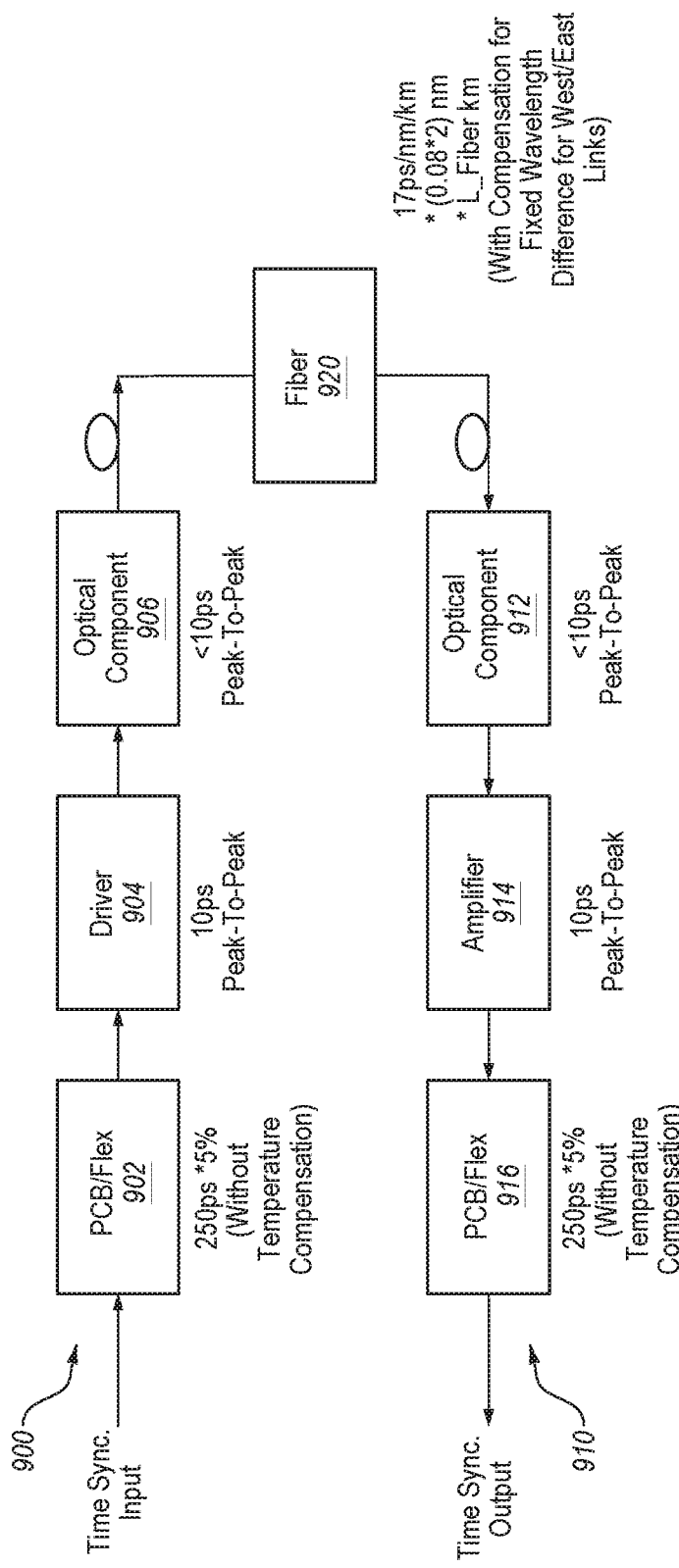
FIG. 9 illustrates time synchronization input and output of the system of FIG. 8.

FIG. 9 illustrates the time synchronization input and output of the system 800 of FIG. 8. Inside each of the transceivers 822, 824 there may be components that affect time synchronization accuracy such as traces, PCBs, flex circuits, or other components that may impact time synchronization, and the impact on time synchronization may be compensated by assigning a delay or latency to such components. For example, as illustrated, on an input side 900 a PCB/flex 902 may introduce a delay of 250 ps*5%, a driver 904 may introduce a delay of 10 ps, and/or an optical component 906 may introduce a delay of 10 ps or less. Similarly, on an output side 910 an optical component 912 may introduce a delay of 10 ps or less, an amplifier 914 may introduce a delay of 10 ps, and a PCB/flex 916 may introduce a delay of 250 ps*5%.

As illustrated, such components may be compensated for on both the input side and the output side. The delays introduced by the components may be added together to obtain a total latency change or delay. In some circumstances, this may be a round trip peak to peak latency variation.

In addition to delays introduced by the components, an extra delay may be caused by wavelength variation of optical signal(s). Such variations may also be included and/or accounted for in the round trip peak to peak latency variation.

In the bidirectional fiber cable, the wavelength of signals traveling in the east and west directions may be different from one another. In some circumstances, the latency difference between the west and east directions can be compensated based on wavelength differences. Specifically, since the nominal wavelength for both directions may be known, the changes in wavelength, or the wavelength difference, may be used to calculate the latency difference.

In some circumstances, the latency difference may be represented by the following formula:

Latency change=D(ps/nm/km)*delta_wavelength(nm)*L (km)

In this formula, D represents the chromatic dispersion coefficient or constant, delta_wavelength represents the wavelength variation of the optical signal, and L represents the length of the transmission medium or optical fiber. In one example, if the wavelength change (delta_wavelength) is +/− 0.08 nm, the chromatic dispersion coefficient may be 17 ps/nm/km, and the latency change may be 17 ps/nm/km* (0.08*2) nm* L_fiber km. This may represent the latency change with compensation for fixed wavelength differences for the west and east links. Accordingly, a fiber 920 may introduce a delay based on the above formula.

For bidirectional DWDM systems, the latency difference of west and east direction can be compensated by the wavelength differences. For un-cooled laser colorless bidirectional transceiver, latency change due to the wavelength drift of laser can be compensated by the following formula:

wavelength drift=laser wavelength slope to bias current*temperature change In this formula, laser wavelength slope to bias current represents how much wavelength change occurs when the bias current changes, and the temperature change represents the temperature change of the laser or laser chip. In some circumstances, the laser wavelength slope to bias current may be around 0.08 nm/C. The temperature of the laser may be detected by thermal resistor positioned sufficiently close to the laser The latency change due to the PCBA/flex may be compensated based on the delay introduced by those components. In some configurations, the length of the traces or other electrical lines in the transceiver may be configured to be substantially the same length on the transmitter and receiver sides of the transceiver. Such configurations ensure that the latency is the same in both directions. In some configurations, the latency change may be identified and/or compensated for by detecting PCBA temperature and calculating the latency change based on the material dielectric constant change.

Figure 10:
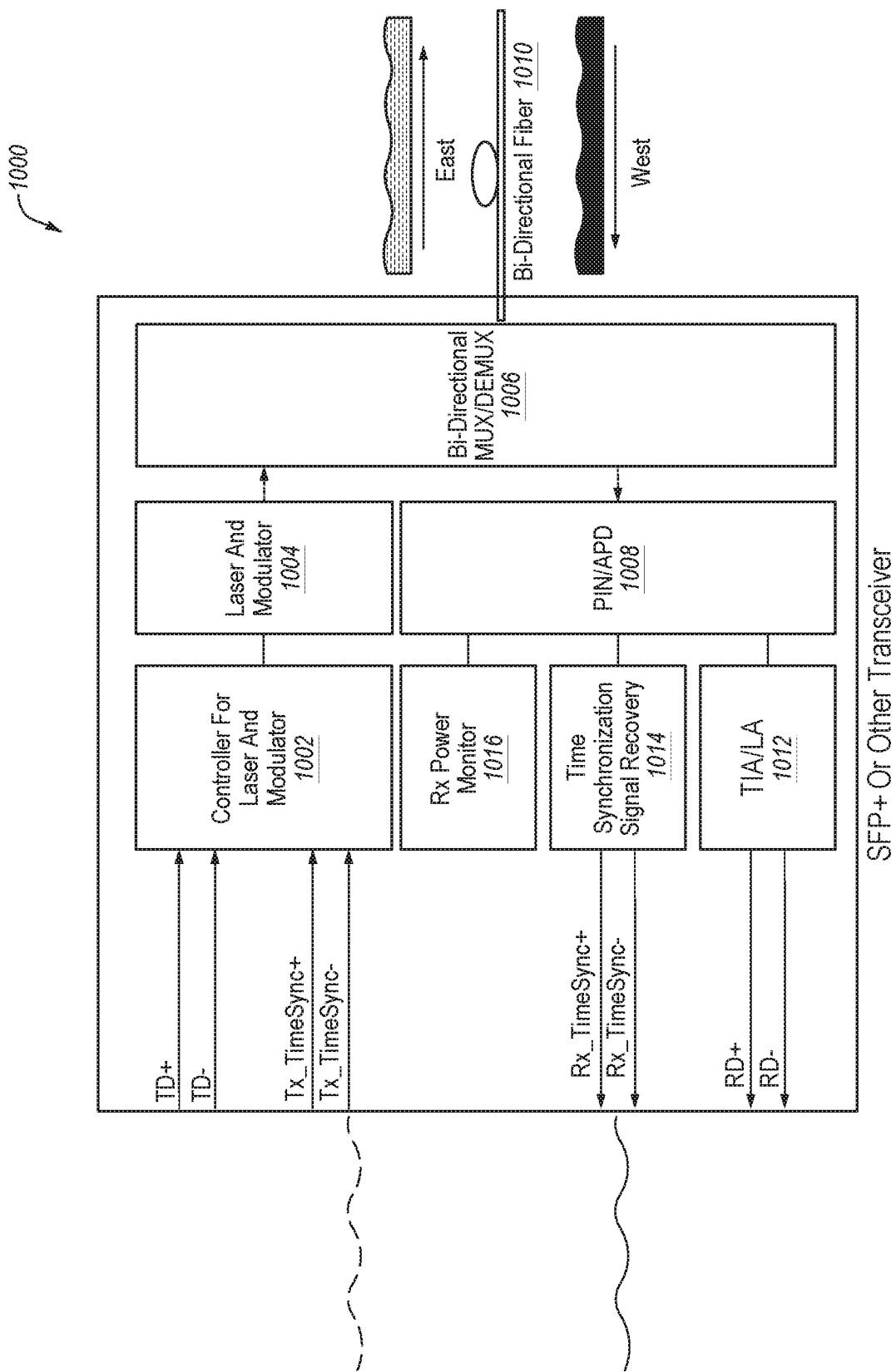
FIG. 10 is a schematic view of an example of a transceiver.

FIG. 10 is a schematic view of an example of a transceiver 1000 that may be used to implement the time synchronization schemes described above. For example, the transceiver 1000 may be used to implement amplitude modulation of the time synchronization signals. The transceiver 1000 may include a controller 1002 and a laser and modulator 1004. The controller 1002 may be configured to control the laser and the modulator 1004. The laser and the modulator 1004 may be coupled to a MUX/DEMUX 1006 configured to multiplex and demultiplex optical signals. An optical fiber 1010 may be coupled to the MUX/DEMUX 1006. The transceiver 1000 may also include a photodiode 1008 which may be a PIN or an avalanche photodiode. The photodiode 1008 may be coupled to a transimpedance amplifier (TIA) 1012, a time synchronization signal recovery module 1014, and a receiver power monitor 1016. The transceiver 1000 my include connections for transmit electrical signals TD+TD− and receive electrical signals RD+RD−.

Although in the illustrated configuration the laser and the modulator 1004 are included together, in other configurations the laser and the modulator may be separate components. In addition, the laser may be any suitable optical transmitter.

As illustrated, in some configurations, the transceiver 1000 may include additional connections for time synchronization signals TX_TimeSync+, TX_TimeSync−, RX_TimeSync+, RX_TimeSync−. In the illustrated configuration, the transceiver 1000 includes two couplings for time synchronization signals TX_TimeSync+, TX_TimeSync− on the transmit side of the transceiver 1000 and two couplings for time synchronization signals RX_TimeSync+, RX_TimeSync− on the receiver side of the transceiver 1000.

The time synchronization signals on the transmit side may be transmitted to the controller 1002 for the laser and modulator 1004, which in turn operates a laser and/or modulator 1004 to transmit data signals and time synchronization signals over the bidirectional optical fiber 1010 (via the MUX/DEMUX 10006 if the system is a DWDM system). The controller 1002 may amplitude modulate the time synchronization signals to be transmitted over the optical fiber 1010 along with the data signals.

The time synchronization signals RX_TimeSync+, RX_TimeSync− on the receiver side may be recovered by the time synchronization signal recovery module 1014 coupled to the photodiode 1008 or other suitable receiver (e.g., avalanche photodiode). In some circumstances, the time synchronization signal recovery module 1014 may include a low pass filter to recover time synchronization signals. The data signals may be received at the photodiode 1008 and may be sent to the TIA 1012 for further processing/modulation. The transceiver 1000 may also include the power monitor 1016 to monitor received signals. In some configurations, the transceiver 1000 may be an SFP+ transceiver.

Figure 11:
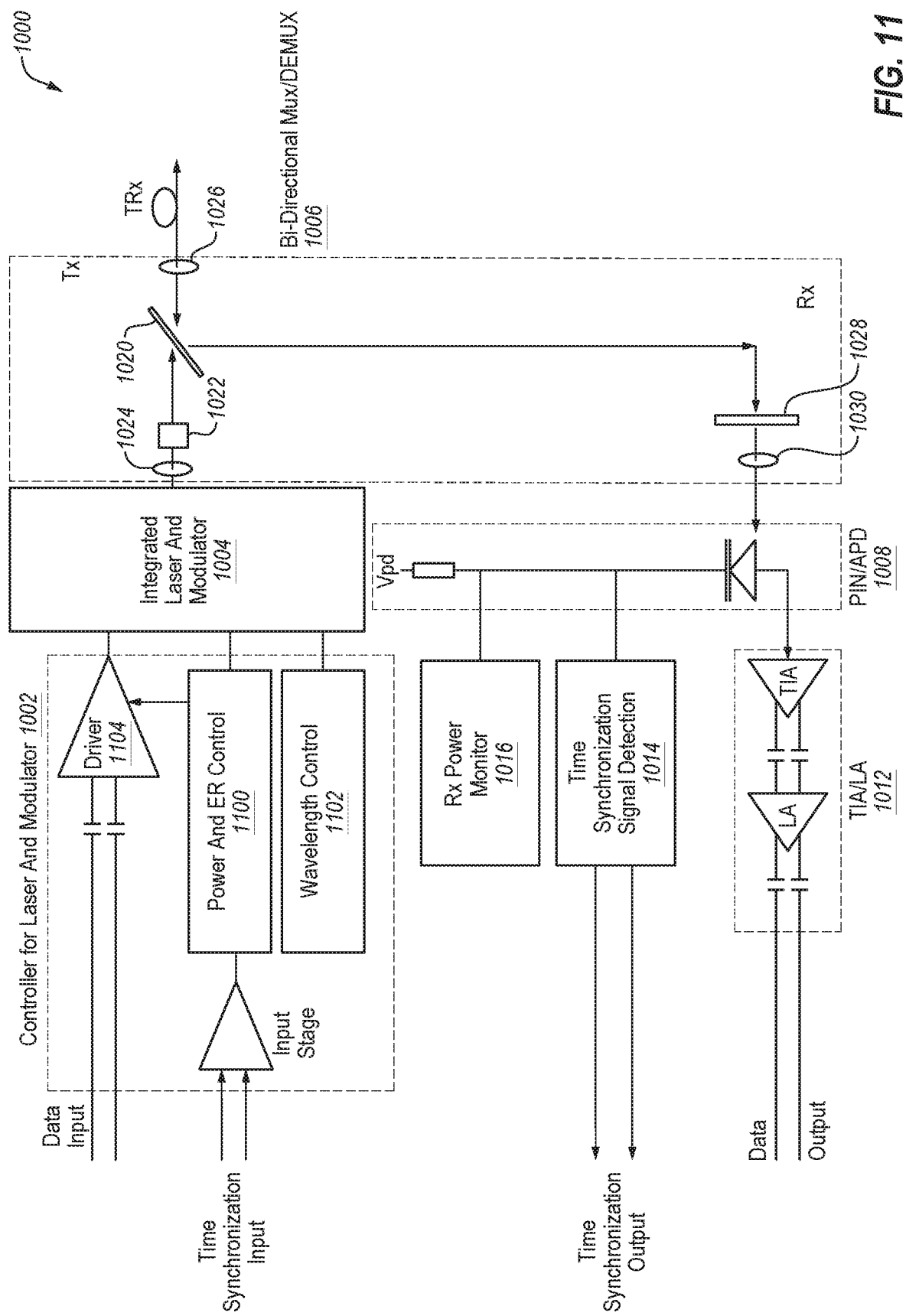
FIG. 11 is a schematic view of the transceiver of FIG. 10.

FIG. 11 is a schematic view of the transceiver 1000 of FIG. 10 in further detail. FIG. 11 illustrates some additional details of the transceiver 1000, showing, for example, electrical and optical components that may be included. As illustrated, the controller may include a power and extinction ratio (ER) control module 1100 and a driver 1104 that drives the integrated laser and modulator 1004. The power and ER control module 1100 may change the power of the driver 1104 to modulate the amplitude of the signals emitted by the laser and combine the data signals with the time synchronization signals. The power and ER control module 1100 may change the extinction ratio (ER) of the driver 1104 to modulate the amplitude of the signals emitted by the laser 1004 and combine the data signals with the time synchronization signals. The transceiver 1000 may also include a wavelength control 1102 that modulates the wavelength of the laser 1004.

The transceiver 1000 may include optical components such as various lenses, isolators and/or filters. As illustrated, the optical components may be included as part of the bidirectional MUX/DEMUX 1006. The transceiver 1000 may include a filter 1020 that permits optical signals from the integrated laser and modulator 1004 on the transmit side (TX) of the transceiver 1000 to pass through the filter 1020 and be transmitted through the optical fiber. A lens 1022 may be positioned between the integrated laser and modulator 1004 and the filter 1020. A lens 1026 may be positioned on the other side of the filter 1020, for example, between the filter 1020 and an optical fiber. The filter 1020 may reflect signals received from the optical fiber and may direct the signals to the receiver side (RX) of the transceiver 1000. The received signals (RX) may pass through another filter 1028 and/or a lens 1030 and may pass to the photodiode 1008 or other suitable receiver. The time synchronization signal detection module 1014 may detect the power/amplitude/modulation changes caused by the power & ER control module 1100 to recover the time synchronization signals. The data signals may travel to the TIA 1012 to be output from the transceiver.

Figure 12:
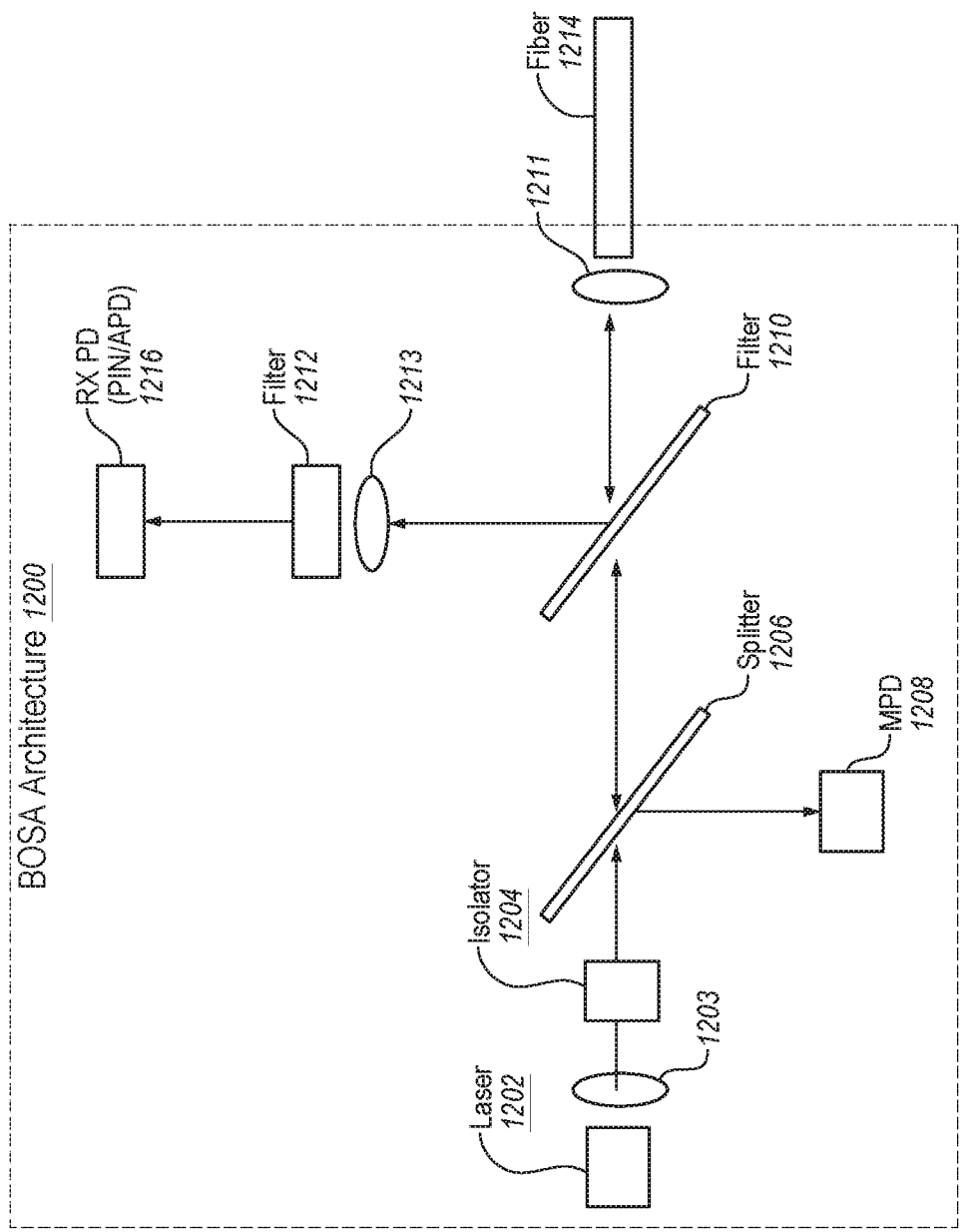
FIG. 12 is a schematic view of an example of a bidirectional optical subassembly.

FIG. 12 is a schematic view of an example of a bidirectional optical subassembly (BOSA) 1200 that may be implemented the time synchronization schemes described above. For example, the BOSA 1200 may be used to implement amplitude modulation of the time synchronization signals. As illustrated, the BOSA 1200 may include a laser 1202 that emits optical signals. The optical signals may travel through a lens 1203 and/or an isolator 1204 to a splitter 1206. The splitter 1206 may direct at least a portion of the optical signals to a monitor photodiode (MPD) 1208, and at least a portion of the optical signals may pass through the splitter 1206 to a filter 1210, the filter 1210 may permit the optical signals to pass through the filter 1210, through a lens 1211 and into an optical fiber 1214. The filter 1210 may reflect signals received from the optical fiber 1214 and may direct the signals through a lens 1213, another filter 1212, to a receiver/photodiode 1216. The receiver 1216 may include an avalanche photodiode or other suitable receiver.

Figure 13:
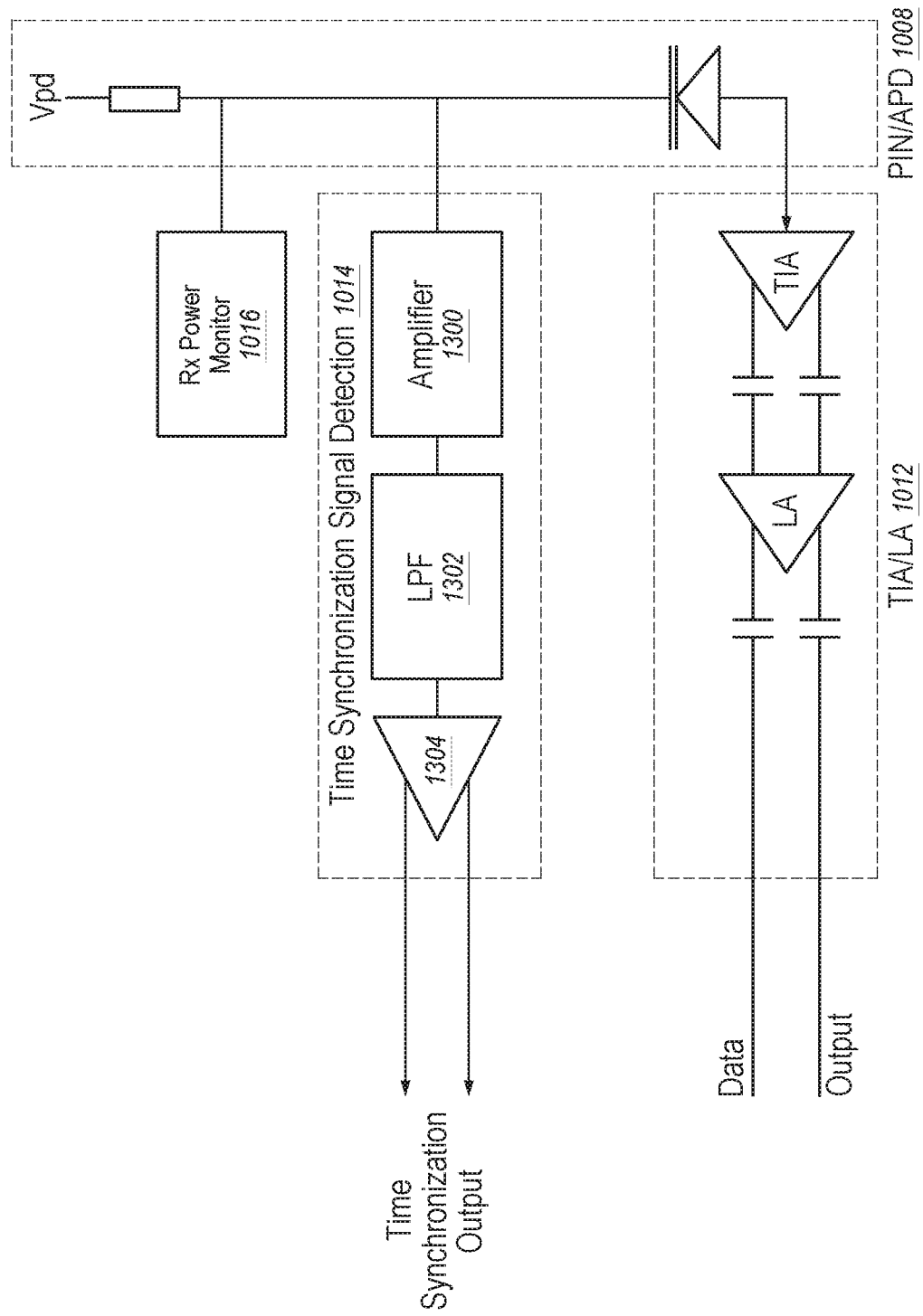
FIG. 13 is a schematic view of a portion of the transceiver of FIGS. 10 and 11.

FIG. 13 is a schematic view of a portion of the transceiver 1000 of FIGS. 10 and 11 in further detail. As illustrated, the time synchronization signal recovery module 1014 may include an amplifier 1300, a low pass filter 1302, and a limiting amplifier 1304. The amplifier 1300 may receive signals from the photodiode 1008 and may amplify the signals. The low pass filter 1302 may be configured to filter out certain signals received from the photodiode 1008, for example, the time synchronization signals. The limiting amplifier 1304 may allow signals (such as the time synchronization signals) below a specified input power or level to pass through it unaffected while attenuating the peaks of stronger signals that exceed this threshold.

Figure 14:
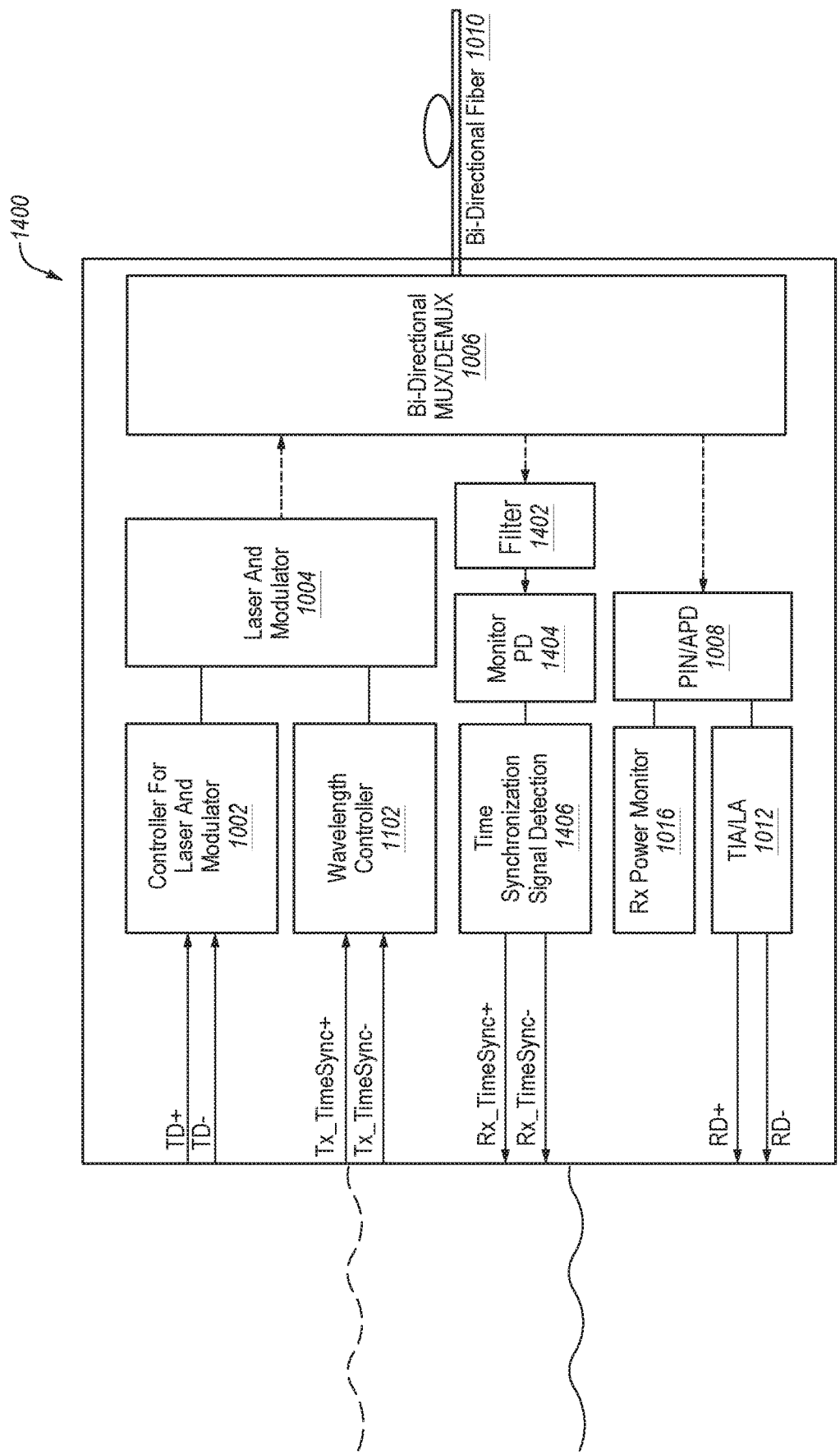
FIG. 14 is a schematic view of an example of a transceiver.

FIG. 14 is a schematic view of an example of a transceiver 1400 that may be used to implement the time synchronization schemes described above. For example, the transceiver 1400 may be used to implement frequency modulation of the time synchronization signals. The transceiver 1400 may include components or features discussed above, and components previously described are indicated with the same numbers for brevity. As illustrated, in some configurations, the transceiver 1400 may include additional connections for time synchronization signals, similar to the transceiver 1000 of FIG. 10.

The transceiver 1400 may include the controller 1002 which operates the laser and/or modulator 1004 to transmit data signals over the bidirectional optical fiber 1010 (via the MUX/DEMUX 1006 if the system is a DWDM system).

The time synchronization signals on the transmit side may be transmitted to the wavelength controller 1102 which may be coupled to the laser and modulator 1004. The wavelength controller 1102 may change the frequency/wavelength of signals emitted by the laser and modulator 1004. The wavelength controller 1102 may frequency modulate or wavelength the time synchronization signals to be transmitted over the optical fiber 1010 along with the data signals.

On the receiver side, the transceiver 1400 may include a filter 1402 that detects changes in frequency/wavelength to filter out the time synchronization signals to be transmitted to a dedicated monitor photodiode (MPD) 1404 or other receiver suitable to receive the time synchronization signals. The monitor photodiode 1404 is coupled to a time synchronization detection module 1406 that may be configured to receive, amplify, and/or process the time synchronization signals received by the monitor photodiode 1404.

The transceiver 1400 also includes the avalanche photodiode 1008 (PIN/APD) or other receiver suitable to receive the data signals from the optical fiber 1010. The photodiode 1008 may be coupled to the receiver power monitor 1016 and/or the TIA 1012 which may receive the data signals.

Figure 15:
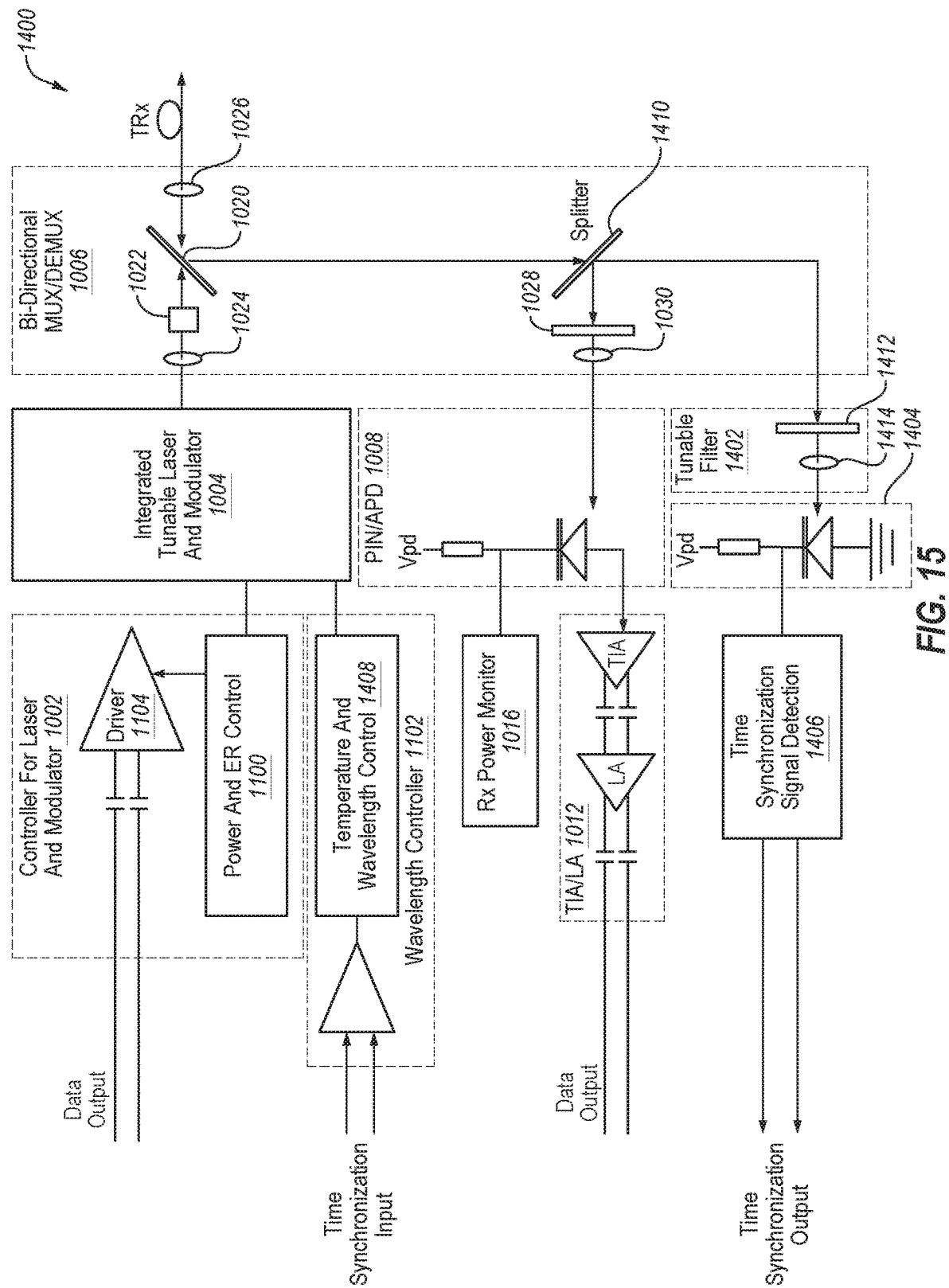
FIG. 15 is a schematic view of the transceiver of FIG. 14.

FIG. 15 is a schematic view of the transceiver 1400 of FIG. 14 in further detail. FIG. 15 illustrates some additional detail of the transceiver 1400, showing, for example, electrical and optical components that may be included.

In the illustrated embodiment, the integrated laser and modulator 1004 may include a tunable laser. The transceiver 1400 may also include a temperature and wavelength control module 1408. The temperature and wavelength control module 1408 may be configure to change the frequency/wavelength of signals emitted by the tunable laser of the integrated laser and modulator 1004. The temperature and wavelength control module 1408 may frequency modulate the time synchronization signals to be transmitted over the optical fiber along with the data signals.

The transceiver 1400 may include optical components such as various lenses, isolators and/or filters, such as the lenses 1024, 1026, 1030, the filters 1020, 1028, and the isolator 1022. As illustrated, the optical components may be included as part of the bidirectional MUX/DEMUX 1006. The transceiver 1400 may also include a splitter 1410. The received signals (RX) may pass through the splitter 1410 that directs at least a portion of the received signals to the filter 1028 and the lens 1030. At least a portion of the received signals may pass through the filter 1028 and the lens 1030 to the photodiode 1008 or other suitable receiver. The splitter 1410 may also direct at least a portion of the received signals through a tunable filter 1402, which may include a filter 1412 and/or a lens 1414. The received signals may travel through the tunable filter 1402 to the monitor photodiode 1404 coupled to the time synchronization signal detection module 1406. In some configurations, the filter 1402 may be tunable because wavelength and/or frequency of the time synchronization signals may change based on temperature or other factors. The filter 1402 may be tuned to suitably recover all of the time synchronization signals received at the transceiver. The synchronization signal detection module 1406, along with the tunable filter 1402, may recover the frequency/wavelength tuned time synchronization signals to be output from the transceiver 1400, or from another transceiver.

Figure 16:
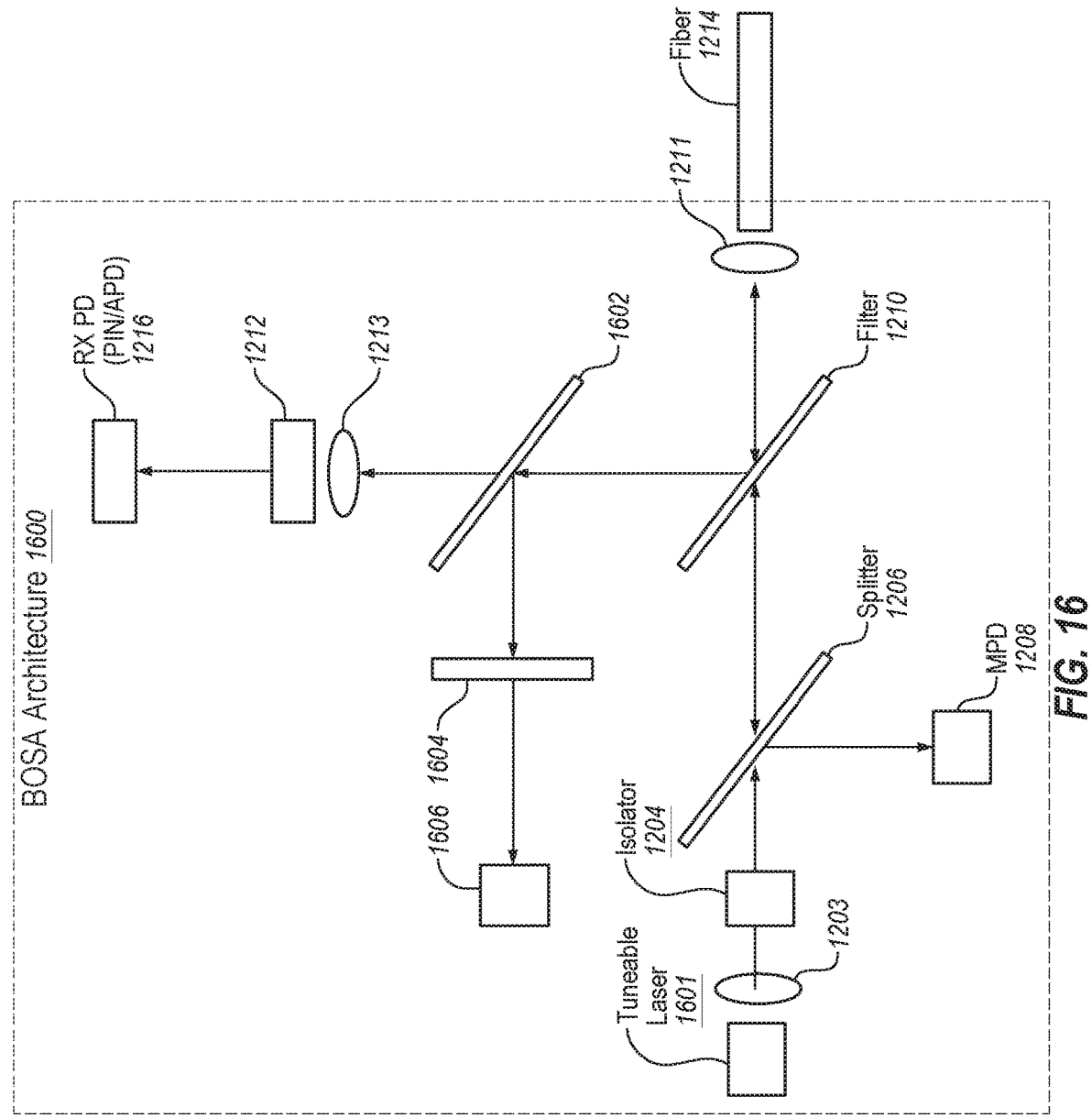
FIG. 16 is a schematic view of a bidirectional optical subassembly.

FIG. 16 is a schematic view of an example of a bidirectional optical subassembly (BOSA) 1600 that may be implemented the time synchronization schemes described above. For example, the BOSA 1600 may be used to implement frequency modulation of the time synchronization signals. The transceiver 1600 may include components or features discussed above, and components previously described are indicated with the same numbers for brevity.

As illustrated, the BOSA 1600 may include a tunable laser 1601 that emits optical signals. The optical signals may travel through the lens 1203 and/or the isolator 1204 to the splitter 1206. The splitter 1206 may direct at least a portion of the optical signals to the MPD 1208, and at least a portion of the optical signals may pass through the splitter 1206 to the filter 1210, the filter 1210 may permit the optical signals to pass through the filter 1210, through the lens 1211 and into the optical fiber 1214. The filter 1210 may reflect signals received from the optical fiber 1214 and may direct the signals to a splitter 1602. The splitter 1602 may direct a portion of the signals through the lens 1213, the filter 1212 to the receiver/photodiode 1216. The receiver 1216 may include an avalanche photodiode or other suitable receiver. The splitter 1602 may also direct a portion of the signals to a tunable filter 1604. The signals may pass through the tunable filter 1604 to a time synchronization monitor photodiode 1606, or other suitable receiver. The time synchronization signals may be received at the time synchronization monitor photodiode 1606.

Figure 17:
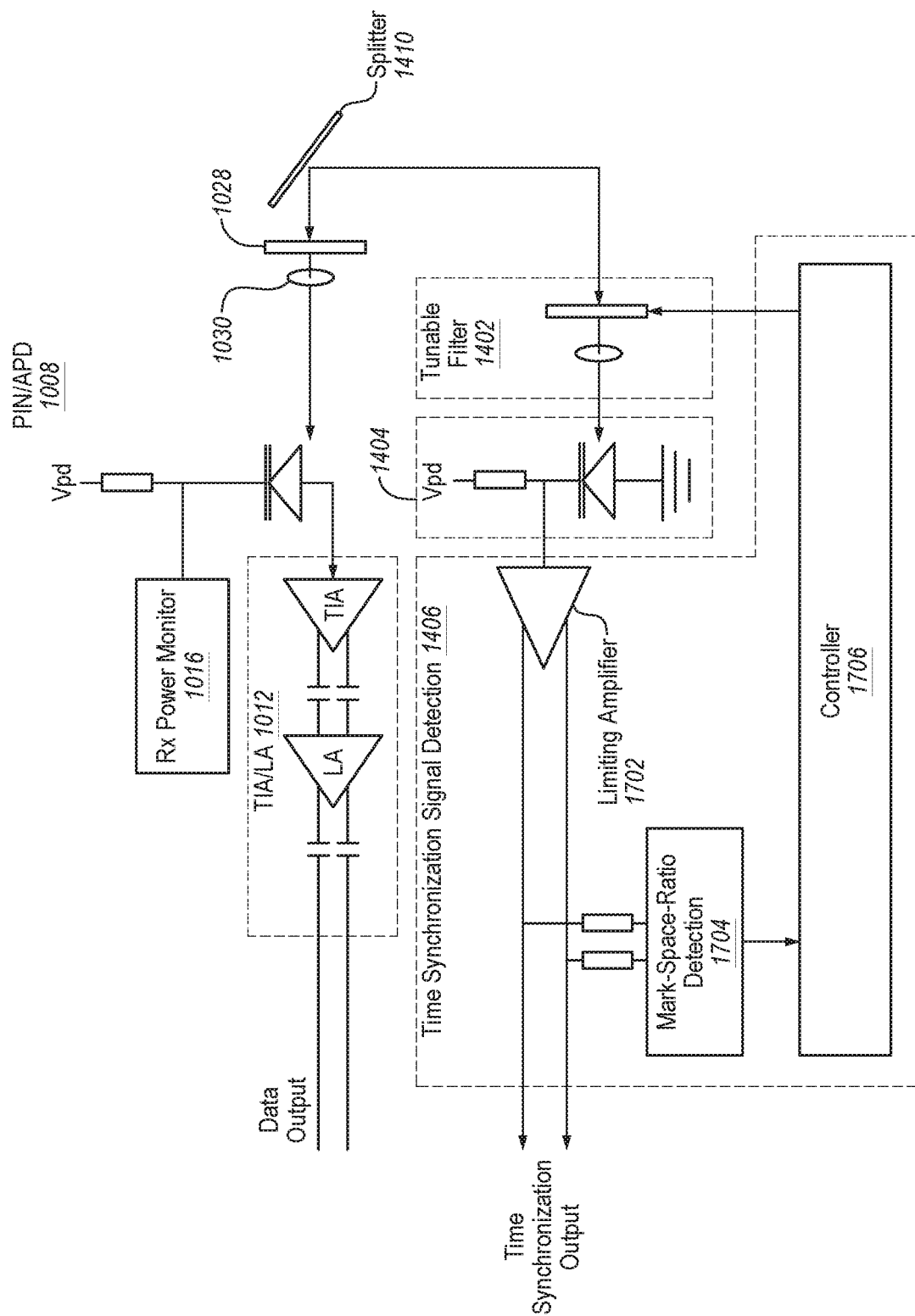
FIG. 17 is a schematic view of a portion of the transceiver of FIGS. 14 and 15.

FIG. 17 is a schematic view of a portion of the transceiver 1400 of FIGS. 14 and 15 in further detail. As illustrated, the time synchronization signal recovery module 1406 may include a limiting amplifier 1702, a mark-space-ratio detector 1704 and a controller 1706. The limiting amplifier 1702 may allow signals (such as the time synchronization signals) below a specified input power or level to pass through it unaffected while attenuating the peaks of stronger signals that exceed this threshold.

The mark-space-ratio detector 1704 may detect the mark-space-ratio of received signals and transmit this information to the controller 1706. The controller 1706 may be configured to control the tunable filter 1402. In some configurations, the controller 1706 may control the tunable filter 1402 to achieve a 50% mark-space-ratio.

Figure 18:
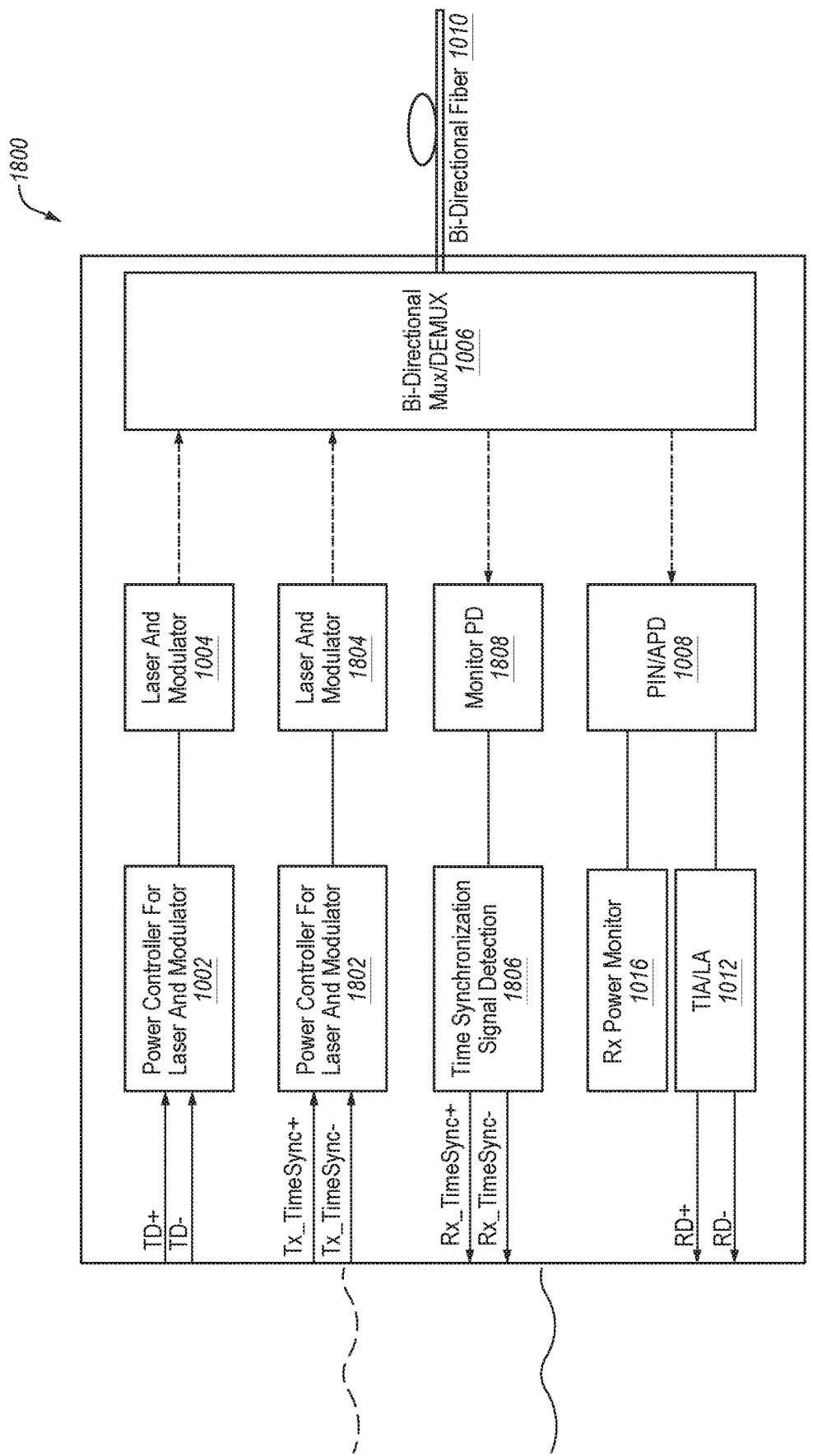
FIG. 18 is a schematic view of another example of a transceiver.

FIG. 18 is a schematic view of another example of a transceiver 1800. The transceiver 1800 may include components or features discussed above, and components previously described are indicated with the same numbers for brevity. In the illustrated configuration, the transceiver 1800 uses different wavelengths to transmit and/or receive time synchronization signals and main data signals. Accordingly, the transceiver 1800 includes an additional power controller 1802 and an additional laser and modulator 1804 to transmit time synchronization signals. The power controller 1802 receives electrical time synchronization signals and controls the laser and modulator 1804 to generate time synchronization signals which are directed to the optical fiber 1010 via the MUX/DEMUX 1006.

The transceiver 1800 also includes an additional monitor photodiode (MPD) 1808 and a time synchronization signal detection module 1806 communicatively coupled to the MPD 1808. The MPD 1808 may receive time synchronization signals from the optical fiber 1010 via the MUX/DEMUX 1006. The time synchronization signal detection module 1806 that may be configured to receive, amplify, and/or process the time synchronization signals received by the monitor photodiode 1808.

In the configuration illustrated, the transceiver 1800 may use two separate wavelengths (or ranges of wavelengths) to transmit and receive time synchronization signals. For example, the transceiver 1800 may transmit time synchronization signals with a first wavelength (or range of wavelengths) in a first direction (e.g., east) over the optical fiber 1010, and may receive time synchronization signals with a second wavelength (or range of wavelengths) in a second direction (e.g., west) over the optical fiber 1010.

Figure 19:
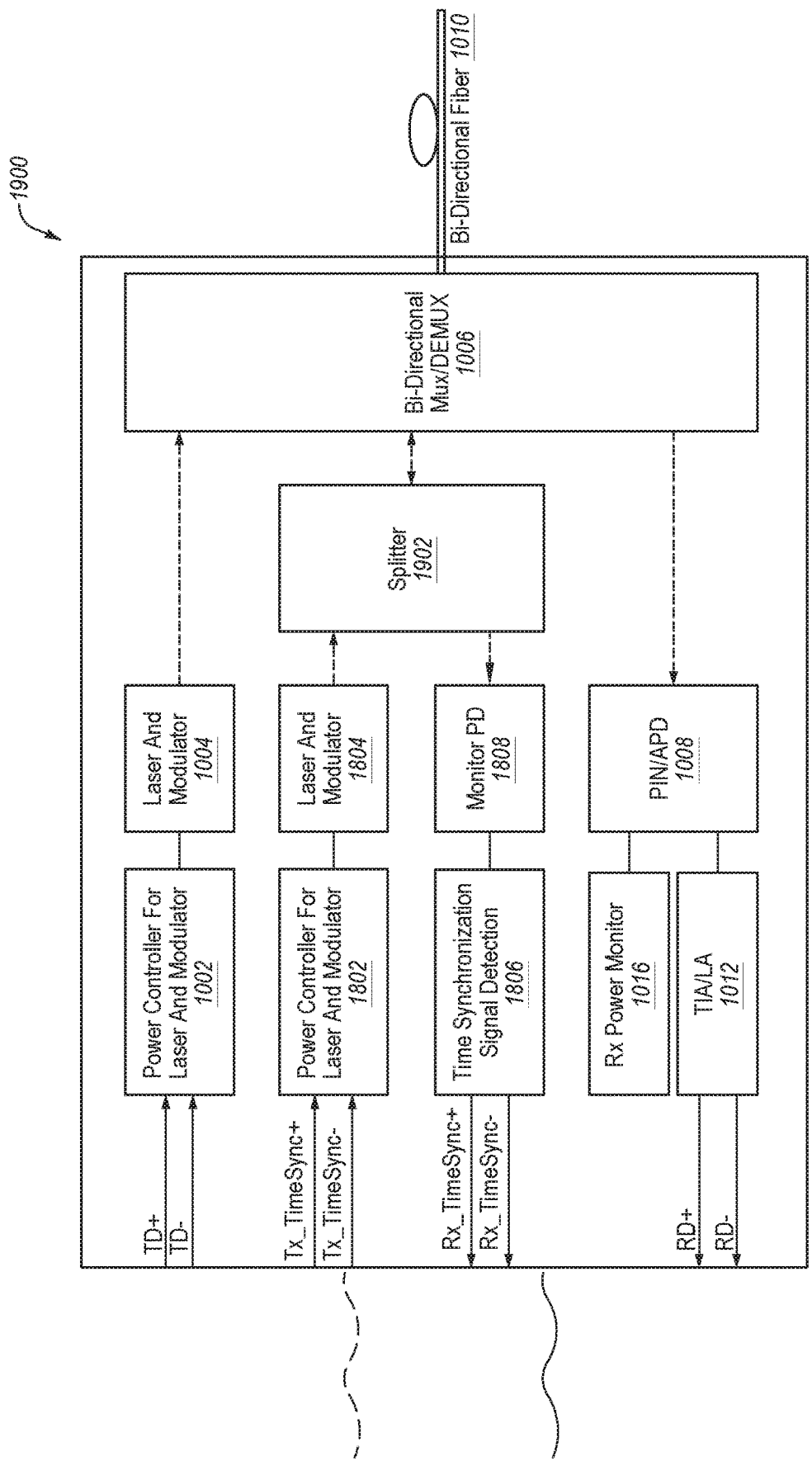
FIG. 19 is a schematic view of another example of a transceiver.

FIG. 19 illustrates an example of a transceiver that may send and receive time synchronization signals with the same wavelength (or ranges of wavelengths). FIG. 19 is a schematic view of another example of a transceiver 1900. The transceiver 1900 may include components or features discussed above, and components previously described are indicated with the same numbers for brevity.

As illustrated, the transceiver 1900 includes a splitter 1902 positioned between the MUX/DEMUX 1006, the laser and modulator 1804 and the MPD 1808. The splitter 1902 may separate traffic in two opposite directions inside a transceiver 1900. In particular, the splitter 1902 may direct optical synchronization signals generated by the laser and modulator 1804 into the optical fiber 1010 via the MUX/DEMUX 1006. The splitter 1902 may also direct optical synchronization signals from the optical fiber 1010 to the MPD 1808 via the MUX/DEMUX 1006. In such configurations, the received optical synchronization signals may include the same wavelength or range of wavelengths as the optical synchronization signals generated by the laser and modulator 1804.

In some circumstances, the configuration of the transceiver 1800 of FIG. 18, with different wavelengths for different directions, may make it easier to split the optical synchronization signals from the main data signals because the signals may be separated by the MUX/DEMUX 1006 based on wavelength. However, in some circumstances the splitter 1902 may be a power splitter, and may direct 50% of optical signals from the laser and modulator 1804 to the optical fiber 1010, and/or may direct 50% of optical signals from optical fiber 1010 to the MPD 1808. Such configurations may also be relatively simple or inexpensive to implement.

In some circumstances, the configuration of the transceiver 1800 or the transceiver 1900 may be implemented in point to point links with SFP+ transceivers or other suitable transceivers. In some configurations, the laser and modulator 1804 used for the time synchronization signals in the transceivers 1800, 1900 may implement an inexpensive and/or cost-effective laser so as not to significantly increase costs of implementing time synchronization through dedicated channels. In such configurations, a separate physical channel may be used to transmit the time synchronization signals.

In some configurations, the optical transmitters, lasers, and/or the modulators described herein may be directly modulated optical transmitters, directed modulation optical transmitters and/or directed modulator optical transmitters. For example, the laser and the modulator 1004 may include a directed modulation optical transmitter or a directed modulator optical transmitters. In other configurations, the optical transmitters, lasers, and/or the modulators described herein may include a tunable laser with an external modulator. For example, the laser and the modulator 1004 may include a tunable laser with an external modulator. In some configurations, the modulators described herein may include a Mach-Zehnder modulator. The Mach-Zehnder modulator may be used to control or modulate the amplitude of the optical signals, for example, to transmit time synchronization signals along with main data signals. In other configurations, the modulators described herein may include an electro-absorption modulator. The electro-absorption modulator may be used to modulate the intensity of the optical signals, for example, to transmit time synchronization signals along with main data signals.

The time synchronization configurations described herein may be used instead of GPS-based time synchronization configurations. In the configurations described herein, time synchronizations signals are transmitted separately from the main data signals. However, in some of the described configurations the time synchronizations signals are transmitted via the same transmission medium (e.g., optical fiber) as is used for the main data signals, but on different channels (e.g., different wavelength channels). In such configurations, changes to the main signal may not affect the time synchronizations signals. Accordingly, time synchronization signal accuracy may be maintained throughout the network implementing the concepts described. Furthermore, the described configurations may be implemented in different types of networks that require time synchronization, and the various configurations described may meet module requirements and/or network requirements for different systems.

Although the above concepts are described in the context of transceivers, and the transceivers may include both an optical transmitter and an optical receiver, the concepts described herein may be implemented in any suitable optoelectronic modules. For example, in some configurations optoelectronic modules implementing the concepts described herein may include one more optical transmitters and no optical receivers, or one more optical receivers and no optical transmitters. Any suitable optoelectronic device may be adapted to implement the concepts described herein.

The terms and words used in the description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. An optoelectronic module for use in a network, the network having an optical fiber through which optical signals are transmitted, the optical signals having primary data and phase synchronization data, the network having time synchronization implemented in a Media Access Control Physical (MAC PHY) layer, the optoelectronic module comprising:
   an optical receiver configured to optically couple with the optical fiber, the optical receiver configured to receive the optical signals having the primary data and the phase synchronization data from the optical fiber, wherein the phase synchronization data of the optical signals are frequency or wavelength modulated and configured to be used to compensate for latency delay through the media access control physical (MAC PHY) layer, wherein the phase synchronization data of the optical signals are received along with the received primary data of the optical signals; and
   a time synchronization signal detection module communicatively coupled to the optical receiver, the time synchronization signal detection module configured to receive the phase synchronization data of the optical signals that are transmitted through the optical fiber and detect the frequency or wavelength modulations to recover the phase synchronization data indicative of the latency delay through the MAC PHY layer, the time synchronization signal detection module comprising a low pass filter that filters out the phase synchronization data of the optical signals from the primary data of the optical signals.

2. The optoelectronic module of claim 1, the time synchronization signal detection module further comprising:
   an amplifier coupled on a first side of the low pass filter; and
   a limiting amplifier coupled on a second side of the low pass filter.

3. The optoelectronic module of claim 2, wherein the amplifier receives the phase synchronization data as electric signals from the optical receiver and amplifies the electric signals, and the limiting amplifier allows the electric signals below a specified input level to pass through the limiting amplifier and attenuates peaks of the electric signals that exceed the specified input level.

4. The optoelectronic module of claim 1, further comprising:
a receiver power monitor coupled to the optical receiver; and
a transimpedance amplifier coupled to the optical receiver, the transimpedance amplifier configured to process or modulate electric signals of the primary data of the optical signals received by the optical receiver.

5. The optoelectronic module of claim 1, further comprising:
an optical transmitter configured to optically coupled with the optical fiber; and
a controller communicatively coupled to the optical transmitter, the controller configured to operate the optical transmitter to transmit the primary data in the optical signals through the optical fiber.

6. A system comprising:
the optoelectronic module of claim 1; and
an optical multiplexer or demultiplexer optically coupled between the optoelectronic module and the optical fiber.

7. The system of claim 6, wherein the optical fiber is a bidirectional optical fiber.

8. The system of claim 6, wherein the system is a bidirectional dense wavelength division multiplexing system or a bidirectional colorless system, and the system is configured to transmit the primary data of the optical signals and the phase synchronization data of the optical signals in a first direction and an opposite second direction through the optical fiber.

9. An optoelectronic module for use in a network, the network having an optical fiber through which optical signals are transmitted, the optical signals having primary data and phase synchronization data, the phase synchronization data being created by amplitude modulations of a power and extension ratio (ER) module, the network having time synchronization implemented in a Media Access Control Physical (MAC PHY) layer, the optoelectronic module comprising:
an optical receiver configured to optically coupled with the optical fiber, the optical receiver configured to receive the optical signals from the optical fiber, wherein the phase synchronization data of the optical signals are received along with received primary data of the optical signals; and
a time synchronization signal detection module configured to detect the amplitude modulations caused by the power and ER control module to recover the phase synchronization data of the optical signals, the time synchronization signal detection module comprising:
an amplifier;
a low pass filter coupled to the amplifier, wherein the low pass filter filters out the phase synchronization data of the optical signals from the primary data of the optical signals; and
a limiting amplifier coupled to the low pass filter,
wherein using the phase synchronization data of the optical signals, the time synchronization signal detection module is configured to compensate for a first latency delay through the media access control physical (MAC PHY) layer and a second latency delay through the optical fiber in a transmit direction and a receive-direction being approximately equal.

10. The optoelectronic module of claim 9, wherein the amplifier receives the phase synchronization data as electric signals from the optical receiver and amplifies the electric signals.

11. The optoelectronic module of claim 9, wherein the limiting amplifier allows the electric signals below a specified input level to pass through the limiting amplifier and attenuates peaks of the electric signals that exceed the specified input level.

12. The optoelectronic module of claim 9, further comprising:
a receiver power monitor coupled to the optical receiver; and
a transimpedance amplifier coupled to the optical receiver, the transimpedance amplifier configured to process or modulate electrics signals of the primary data of the optical signals received by the optical receiver.

13. The optoelectronic module of claim 9, further comprising:
an optical transmitter configured to optically coupled with the optical fiber; and
a controller communicatively coupled to the optical transmitter, the controller configured to operate the optical transmitter to transmit the primary data in the optical signals throe the optical fiber.

14. A system comprising:
the optoelectronic module of claim 9; and
an optical multiplexer or demultiplexer optically coupled between the optoelectronic module and the optical fiber.

15. The system of claim 14, wherein the optical fiber is a bidirectional optical fiber.

16. The system of claim 14, wherein the system is a bidirectional dense wavelength division multiplexing system or a bidirectional colorless system.

17. The optoelectronic module of claim 1, wherein the phase synchronization data of the optical signals are Precision Time Protocol (PTP) synchronization signals.

18. The optoelectronic module of claim 1, wherein the latency delay through the MAC PHY layeris caused by at least one or more of: a first-in-first-out buffer, a phase-locked loop circuit, a physical serializer circuit, a physical deserializer circuit, a signal process unit, and a clock data recovery circuit.

19. The optoelectronic module of claim 1, further comprising a controller configured to compensate for the latency delay through the MAC PHY laver.

20. The optoelectronic module of claim 19, wherein the controller estimates the latency delay through the optical fiber by dividing a time difference between two of the phase synchronization data of the optical signals in half.

* * * * *